United States Patent
Ito et al.

(10) Patent No.: US 8,943,525 B2
(45) Date of Patent: Jan. 27, 2015

(54) INFORMATION PROCESSING APPARATUS, INFORMATION PROCESSING METHOD, AND PROGRAM

(71) Applicant: Sony Corporation, Tokyo (JP)

(72) Inventors: Akihiko Ito, Kanagawa (JP); Tetsuo Maruyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/951,523

(22) Filed: Jul. 26, 2013

(65) Prior Publication Data

US 2014/0053175 A1    Feb. 20, 2014

(30) Foreign Application Priority Data

Aug. 16, 2012  (JP) ................................. 2012-180381

(51) Int. Cl.
*H04H 60/33* (2008.01)
*G06F 3/00* (2006.01)
*G06F 13/00* (2006.01)
*H04N 5/445* (2011.01)
*H04N 21/482* (2011.01)

(52) U.S. Cl.
CPC .................................. *H04N 21/482* (2013.01)
USPC ................................................ 725/9; 725/46

(58) Field of Classification Search
USPC ...................... 725/9, 14, 37, 38, 46
See application file for complete search history.

(56) References Cited

U.S. PATENT DOCUMENTS 7,995,505 B2 *  8/2011  Beaupre et al. ............... 370/276
2007/0266401 A1 * 11/2007  Hallberg ........................ 725/46
2012/0078714 A1 *  3/2012  Gross ........................ 705/14.52

FOREIGN PATENT DOCUMENTS

JP    2011-170583 A    9/2011

* cited by examiner

*Primary Examiner* — John Schnurr
(74) *Attorney, Agent, or Firm* — Lerner, David, Littenberg, Krumholz & Mentlik, LLP

(57) ABSTRACT

Provided is an information processing apparatus, including: storage configured to store a rarity level of each of a plurality of pieces of content, and access history of a user, the plurality of pieces of content being accessed by the user; and a controller configured to determine, based on the stored access history, rarity levels of a predetermined number or more of pieces of content, the pieces of content being accessed by the user in a predetermined unit time, to calculate a preference level of the user based on the determined rarity level, and to create information showing the calculated preference level.

14 Claims, 19 Drawing Sheets

FIG.13

INFORMATION PROCESSING APPARATUS, INFORMATION PROCESSING METHOD, AND PROGRAM

BACKGROUND

The present disclosure relates to an information processing apparatus configured to manage information on content, which a user accesses. The present disclosure further relates to an information processing method and a program of the information processing apparatus.

Recently, high-speed networks and high-end mobile devices such as smartphones are widely used. As a result, users are capable of accessing various kinds of content at will. Preference to content and interest in content are different from each user. In addition, preference to content and interest in content may change. Because of this, how to provide content that suits users' needs is important for a content provider. Further, how content provided by the content provider catches the eyes of users is also important for a content provider.

Further, some pieces of content provided by a content provider are known to many users and have lower rarity levels. Other pieces of content provided by the content provider are known to a few users and have higher rarity levels. Further, some users are interested in content having a lower rarity level. Other users are interested in content having a higher rarity level.

Japanese Patent Application Laid-open No. 2011-170583 discloses a technology relating to the rarity level. An information search apparatus reflects a rarity level of electronic document information in a search result. As a result, the information search apparatus may raise the output order of electronic document information, of which output order is lower. The output order is based on importance of the document information.

SUMMARY

The technology of Japanese Patent Application Laid-open No. 2011-170583 is capable of providing various kinds of electronic document information. The electronic document information does not place a disproportionate emphasis on a specific field. However, as described above, it is not necessarily the case that all the users want various kinds of electronic document information. For example, some users only wish to access information having a higher rarity level, i.e., information on a specific field. The technology of Japanese Patent Application Laid-open No. 2011-170583 is not capable of providing content that suits users' needs.

In view of the above-mentioned circumstances, it is desirable to provide an information processing apparatus, an information processing method, and a program capable of determining a rarity level of content that users want.

According to an embodiment of the present technology, there is provided an information processing apparatus, including: storage configured to store a rarity level of each of a plurality of pieces of content, and access history of a user, the plurality of pieces of content being accessed by the user; and a controller configured to determine, based on the stored access history, rarity levels of a predetermined number or more of pieces of content, the pieces of content being accessed by the user in a predetermined unit time, to calculate a preference level of the user based on the determined rarity level, and to create information showing the calculated preference level.

According to this configuration, the information processing apparatus may allow an operator of the information processing apparatus or a user to know a rarity level of content that the user wants. Here, the "user" may be one user or may include a plurality of users. Further, according to the present technology, the following assumption is made. That is, a user, who tends to want content having a higher rarity level, has enjoyed content having a lower rarity level, i.e., content high in generality. The user may not be satisfied with the information. A level of a user, who wishes information having a higher rarity level, is referred to as "preference level".

The controller may be configured to calculate the preference level of the user, the preference level being a ratio of the number of pieces of content each having a rarity level equal to or larger than a predetermined threshold to the number of the predetermined number or more of pieces of content, the pieces of content being accessed by the user in the predetermined unit time. Because of this, the information processing apparatus provides a predetermined threshold of a rarity level, to thereby calculate a preference level of a user.

The controller may be configured to calculate acceleration of the preference level, the acceleration of the preference level being a differential between a first preference level and a second preference level, the first preference level being calculated in a first unit time, the second preference level being calculated in a second unit time, the second unit time being later than the first unit time, and to create information showing the calculated acceleration of the preference level.

Because of this, the information processing apparatus may allow an operator or a user himself to know how a preference level of the user changes.

The storage may be configured to store a relation rarity level, the relation rarity level being of relation between a plurality of pieces of content, and the controller may be configured to determine the relation rarity level between first content and second content, the first content being accessed by the user, the second content being accessed by the user after the first content, and to calculate the preference level based on the determined rarity level and the determined relation rarity level.

Because of this, the information processing apparatus is capable of calculating not only a rarity level of content itself but also a preference level based on a relation rarity level between pieces of content, which a user accesses in series. As a result, an operator or a user is capable of understanding whether the user is interested in rarity of content itself or in rarity of relation between pieces of content.

The controller may be configured to create information showing content to be recommended to the user based on the calculated preference level, the content to be recommended relating to content accessed by the user.

Because of this, the information processing apparatus is capable of recommending content, which fits with the preference level of a user, to the user.

The controller may be configured to add predetermined alert information to information showing the preference level in a case where the calculated preference level is equal to or lower than a predetermined threshold.

Because of this, an operator of the information processing apparatus is capable of easily understanding that a user is not interested in the presented content, and that other content is to be presented to the user.

The controller may be configured to create a user interface, the user interface including information showing first content and icons showing a plurality of pieces of second content, the information showing first content being arranged in a first area, the icons showing a plurality of pieces of second content being arranged in a second area, the second content being different from the first content, the second area being different from the first area, the icon being displayed in a display mode depending on the rarity level of each second content or in a display mode depending on the relation rarity level between each second content and the first content.

The information processing apparatus recommends second content in relation with first content to the user. Because of the above-mentioned configuration, at this time, the information processing apparatus allows a user to understand a rarity level of the second content and a relation rarity level between the first content and the second content. The rarity level and the relation rarity level may be used in selecting the second content. Here, there are various "display modes" of an icon. Examples of the "display modes" include the size of the icon, display order, color, presence/absence of a marker, and the like.

The controller may be configured to change the size of the icon on the user interface depending on change of the preference level of a user.

Because of this, the information processing apparatus increase the size of the icon of content, of which relation rarity level is higher, in a case where a preference level is higher. The information processing apparatus increase the size of the icon of content, of which relation rarity level is lower, in a case where a preference level is lower. As a result, the information processing apparatus is capable of recommending content having a relation rarity level, which a user wants moment to moment.

The controller may be configured to set higher rarity level to the content in a case where awareness of information on a creator of the content is lower.

The controller may be configured to set a higher relation rarity level between the first content and the second content in a case where the number of pieces of metadata common to a plurality of pieces of metadata on the first content and a plurality of pieces of metadata on the second content is smaller.

The controller may be configured to set a higher relation rarity level between the first content and the second content in a case where the number of access to the second content by the user immediately after accessing the first content is smaller.

The controller may be configured to set a higher relation rarity level between the first content and the second content in a case where the number of pieces of other content between the first content accessed by the user and the second content accessed by the user is larger.

According to another embodiment of the present technology, there is provided an information processing method, including: storing a rarity level of each of a plurality of pieces of content, and access history of a user, the plurality of pieces of content being accessed by the user; determining, based on the stored access history, rarity levels of a predetermined number or more of pieces of content, the pieces of content being accessed by the user in a predetermined unit time; calculating a preference level of the user based on the determined rarity level; and creating information showing the calculated preference level.

According to another embodiment of the present technology, there is provided a program, causing an information processing apparatus to executes the steps of: storing a rarity level of each of a plurality of pieces of content, and access history of a user, the plurality of pieces of content being accessed by the user; determining, based on the stored access history, rarity levels of a predetermined number or more of pieces of content, the pieces of content being accessed by the user in a predetermined unit time; calculating a preference level of the user based on the determined rarity level; and creating information showing the calculated preference level.

As described above, according to the present technology, it is possible to determine a rarity level of content that users want.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 13 is a diagram showing another display example of the user access behavior window showing a mania level of a user, which is calculated based on a rarity level and based on a relation rarity level counted in this embodiment;

DETAILED DESCRIPTION OF EMBODIMENTS

Hereinafter, an embodiment of the present disclosure will be described with reference to the drawings.

<First Embodiment>

First, a first embodiment of the present technology will be described.

[Network Configuration of System]

Figure 1:
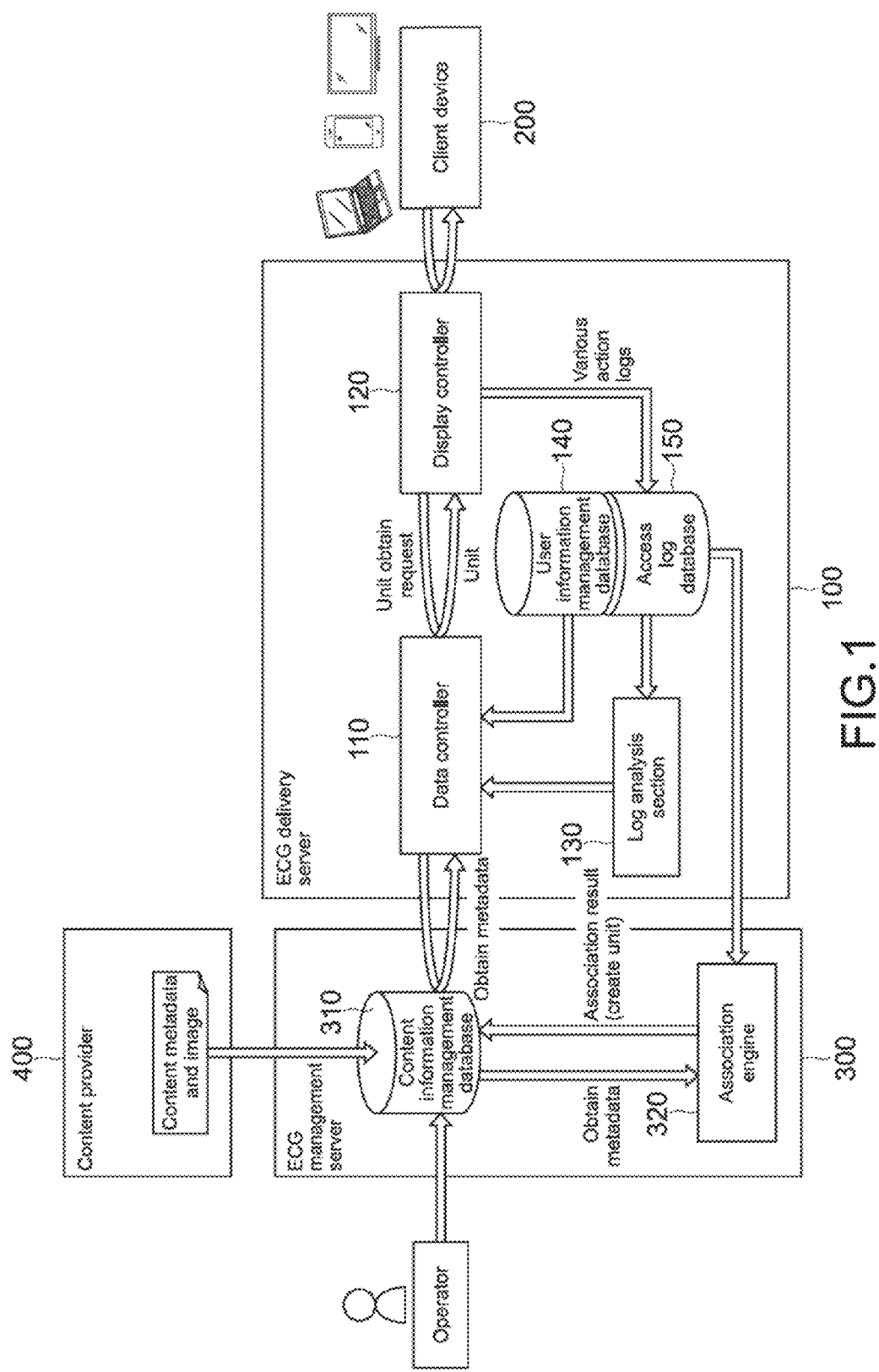
FIG. 1 is a diagram showing the network configuration of a system of an embodiment of the present technology.

FIG. 1 is a diagram showing the network configuration of a system of this embodiment.

As shown in FIG. 1, the system includes an ECG (Electronic Content Guide) delivery server 100, an ECG management server 300, a client device 200, and a content provider 400.

The ECG delivery server 100, the ECG management server 300, and the content provider 400 are in a network (cloud) such as the Internet. The client device 200 is capable of communicating with the ECG delivery server 100 via the network.

The ECG delivery server 100 offers ECG service to the client device 200. That is, the ECG delivery server 100 provides an ECG unit to the client device 200 via, for example, a browser of the client device 200 and the like based on content. Here, the content provider 400 provides the content to the ECG delivery server 100. The ECG management server 300 creates the ECG unit. The ECG unit is a unit of data including content and its related information (related content).

Further, the ECG delivery server 100 manages browse history of the ECG unit, which is provided to the client device 200. The ECG delivery server 100 analyzes content browse behavior of a user based on the browse history. Specifically, the ECG delivery server 100 analyzes the browse behavior by calculating a mania level of a user based on a rarity level of content and based on a relation rarity level between pieces of content (described below).

The ECG service associates various kinds of content with each other, presents them in chains, and increases an opportunity to reach content by a user. Examples of the content include broadcast programs, VOD (Video On Demand) programs, music, moving images, CDs, DVDs, BDs, games, books, maps, shop information, and the like. The opportunity to reach content by a user is thus increased. As a result, a user's "recognition" is induced one after another. The number of a user's action is also increased. The viewer rating of a program, the sale amount of a product, and the like may thus be increased.

The content provider 400 provides content and its metadata to the ECG management server 300. The ECG management server 300 manages the content and its metadata. Further, the ECG management server 300 associates pieces of content with each other, to thereby create the above-mentioned ECG unit. The ECG management server 300 provides the ECG unit to the ECG delivery server 100.

An operator operates the ECG management server 300. Operated by the operator, the ECG management server 300 edits metadata of content, edits (associates) the ECG unit, adds a rarity level to content, edits the rarity level, and the like.

The software module and the database of the ECG delivery server 100 will be described below in detail. The software module and the database of the ECG management server 300 will be described below in detail.

The ECG delivery server 100 delivers an ECG unit as described above. The client device 200 receives the ECG unit. The client device 200 displays the ECG unit. FIG. 1 shows one client device 200. However, there are a plurality of client devices 200. The client device 200 may be any kind of information processing apparatus. Examples of the client device 200 include a smartphone, a mobile phone, a tablet PC (Personal Computer), a desktop PC, a laptop PC, a TV, a PDA (Personal Digital Assistant), a mobile AV player, an electronic book, a digital still camera, a camcorder, a television receiver, a PVR (Personal Video Recorder), a game machine, a projector, a car navigation system, and the like.

[Hardware Configuration of ECG Delivery Server]

Figure 2:
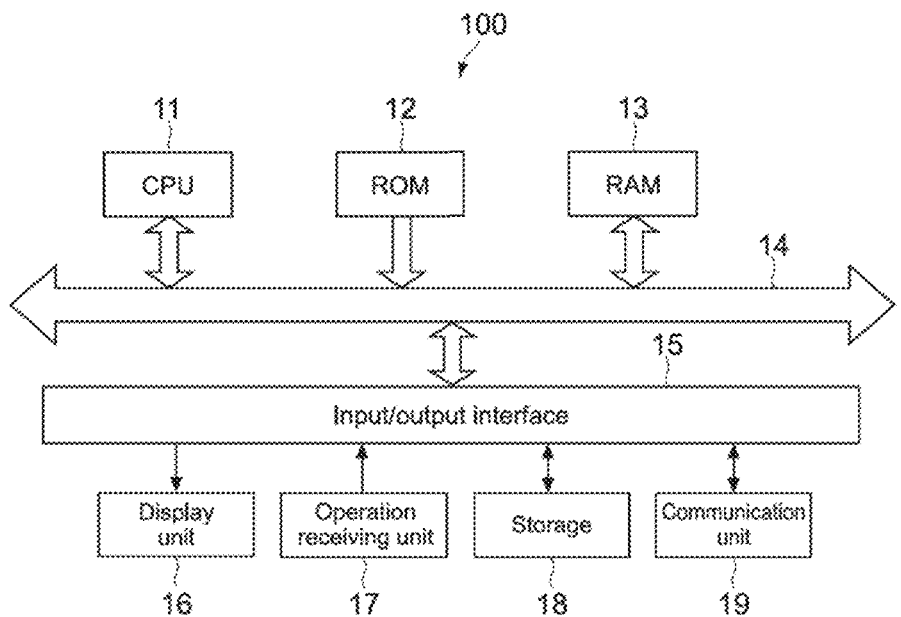
FIG. 2 is a block diagram showing the hardware configuration of an ECG delivery server of the system.

FIG. 2 is a diagram showing the hardware configuration of the ECG delivery server 100. As shown in FIG. 2, the ECG delivery server 100 includes a CPU (Central Processing Unit) 11, a ROM (Read Only Memory) 12, a RAM (Random Access Memory) 13, an input/output interface 15, and a bus 14 connecting them.

The CPU 11 accesses the RAM 13 and the like as necessary, executes various kinds of arithmetic processing, and controls the overall blocks of the ECG delivery server 100. The ROM 12 is a nonvolatile fixed memory. The ROM 12 stores firmware executed by the CPU 11 such as an OS, programs, and various parameters. The RAM 13 is used as a work area of the CPU 11, and the like. The RAM 13 temporarily stores the OS, various applications being executed, and various data being processed.

The input/output interface 15 is connected to a display unit 16, an operation receiving unit 17, storage 18, a communication unit 19, and the like.

The display unit 16 is a display device using, for example, an LCD (Liquid Crystal Display), an OELD (Organic Electroluminescence Display), a CRT (Cathode Ray Tube), or the like. The display unit 16 displays a user access behavior window (described below) and the like, for example.

The operation receiving unit 17 is, for example, a pointing device such as a mouse, a keyboard, a touchscreen, or another input device. If the operation receiving unit 17 is a touchscreen, a single unit including the touchscreen and the display unit 16 may be used.

The storage 18 is a nonvolatile memory such as, for example, a HDD (Hard Disk Drive), a flash memory (SSD; Solid State Drive), another fixed memory, or the like. The storage stores the above-mentioned OS, various applications, and various data. Specifically, in this embodiment, the storage 18 stores programs such as a plurality of software modules, data such as browse history of an ECG unit browsed by a user of the client device, and the like (described below). The programs may be provided to the ECG delivery server 100 via the network. Alternatively, a recording medium, which is readable by the ECG delivery server 100, may store the programs, and the programs may be installed.

The communication unit 19 is a NIC or the like for connecting to the network. The communication unit 19 communicates with the client device 200.

The hardware configuration (not shown) of the ECG management server 300 is similar to the hardware configuration of the ECG delivery server 100.

[Hardware Configuration of Client Device]

Figure 3:
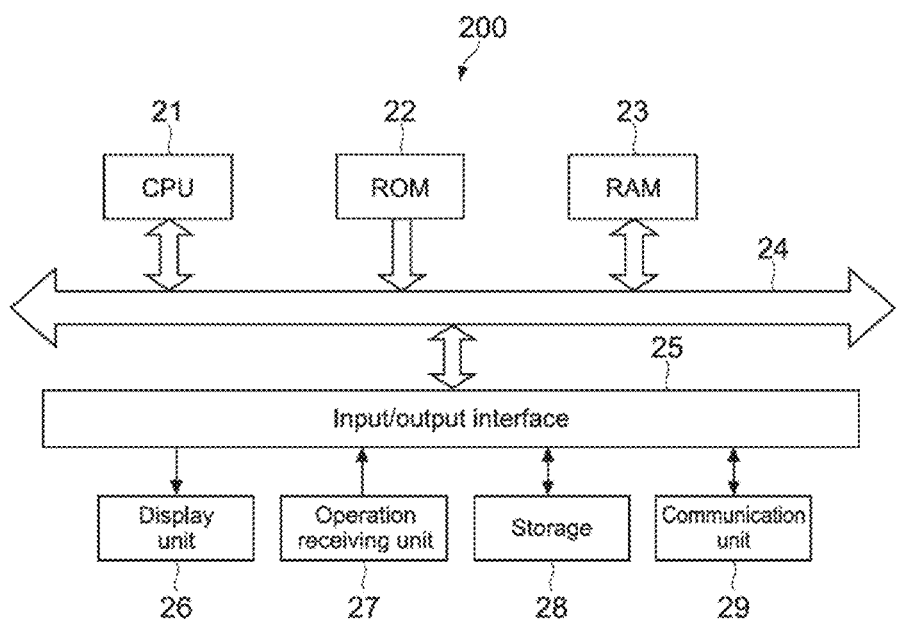
FIG. 3 is a block diagram showing the hardware configuration of a client device of the system.

FIG. 3 is a diagram showing the hardware configuration of the client device 200. As shown in FIG. 3, the hardware configuration of the client device 200 is basically similar to the hardware configuration of the ECG delivery server 100. That is, the client device 200 includes a CPU 21, a ROM 22, a RAM 23, an input/output interface 25, a bus 24 connecting them, a display unit 26, an operation receiving unit 27, storage 28, and a communication unit 29. The display unit 26 may be built in the client device 200, or may be externally connected to the client device 200.

The CPU 21 controls the blocks such as the storage 28 and the communication unit 29. The CPU 21 communicates with the ECG delivery server 100, and processes various data.

The storage 28 stores software (for example, browser, media player, etc.) for displaying and reproducing the ECG unit.

The display unit 26 displays a content browse tendency window (described below) and the like, for example.

If the client device 200 is a mobile device such as a smartphone, the communication unit 29 may be a wireless communication module such as a wireless LAN.

[Software Module Configuration of ECG Server]

As shown in FIG. 1, the ECG management server 300 includes a content information management database 310 as a database, and an association engine 320 as a software module.

The content information management database 310 stores content and its metadata, which are provided by the content provider 400. The content information management database 310 also stores ECG units, which are created by the association engine 320. Further, the content information management database 310 updates data in response to various edit operations from an operator.

The association engine 320 obtains metadata of content from the content information management database 310. The association engine 320 associate a plurality of pieces of content with each other based on the metadata, to thereby create the ECG unit. The content information management database 310 stores the created ECG unit. Further, the association engine 320 sets a rarity level of content and a relation rarity level between pieces of content (described below).

As shown in FIG. 1, the ECG delivery server 100 includes a data controller 110, a display controller 120, and a log analysis section 130 as software modules. The ECG delivery server 100 includes a user information management database 140 and an access log database 150 as databases.

The data controller 110 obtains an ECG unit from the content information management database 310 of the ECG management server 300 in response to an ECG unit obtain request from the display controller 120. The data controller 110 provides the ECG unit to the display controller 120. At this time, the data controller 110 filters an ECG unit to be provided to a user based on user information, a mania level of the user, and the like. Here, the user information management database 140 stores the user information. The log analysis section 130 calculates the mania level of the user.

The display controller 120 creates HTML data based on the ECG unit obtained from the data controller 110. The display controller 120 provides the ECG unit to the client device 200 by using a predetermined API (Application Program Interface). Alternatively, the display controller 120 may not create HTML data. The display controller 120 may provide the API to the client device 200. The client device 200 may directly obtain an ECG unit from the API by using an application dedicated for ECG unit display processing. The client device 200 may display the ECG unit.

Further, the display controller 120 monitors ECG unit browse behavior (access to ECG unit) of a user by using the client device 200. The display controller 120 stores the ECG unit browse behavior in the access log database 150.

The log analysis section 130 calculates a mania level of a user in a field of content based on the browse history, the rarity level of the content, and the relation rarity level between pieces of content. Here, the browse history is stored in the access log database 150.

The user information management database 140 stores a mania level of a user as user's browse behavior in the field. The user information management database 140 also stores identification information such as a user ID. Here, the log analysis section 130 calculates the mania level of a user in each field of content.

As described above, the access log database 150 stores ECG unit browse history of a user.

[Rarity Level of Content and Relation Rarity Level Between Pieces of Content]

Next, a rarity level of content and a relation rarity level between pieces of content will be described. According to this embodiment, the ECG delivery server 100 uses the rarity level and the relation rarity level to calculate a mania level of a user of the client device 200. Here, the "mania level of a user" indicates a level of a user that he wants content having a higher rarity level. A preference level (interest level) of a user includes the concept "mania level of a user".

Figure 4:
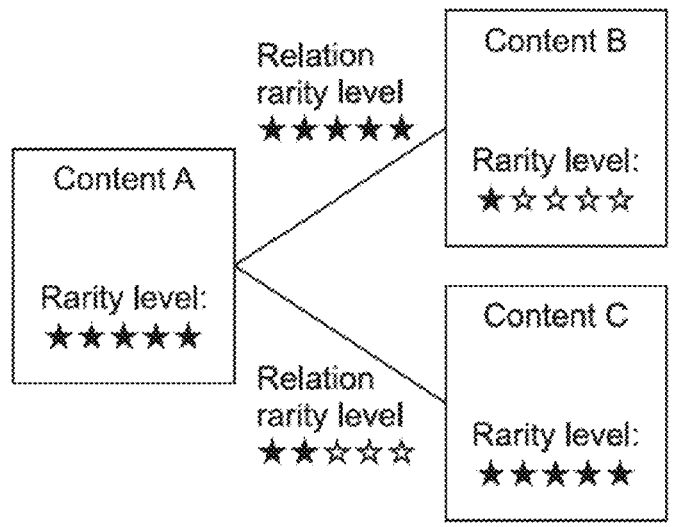
FIG. 4 is a diagram for explaining the concept of a rarity level of content and the concept of a relation rarity level between pieces of content in the system.

FIG. 4 is a diagram for explaining the concept of a rarity level of content and the concept of a relation rarity level between pieces of content in the system.

The "rarity level of content" value indicates rarity (awareness) of the content. For example, in the example of FIG. 4, the rarity level of content is expressed in five levels by using star marks. Alternatively, the rarity level may be expressed by a percent where the perfect score is 100 points or 1.0 points, as a matter of course.

In FIG. 4, the rarity level of content A is high (five stars). The rarity level of content C is high (five stars). The rarity level of content B is low (one star).

Further, in this embodiment, the rarity level of content itself is used, and in addition, the concept "relation rarity level" is used. The "relation rarity level" indicates a rarity level of relation between two pieces of content.

For example, in FIG. 4, the rarity level of the content B is very low. That is, the content B has mass appeal and is all-too-common. However, the relation between the content A and the content B is arcane and geeky. So the relation rarity level between the content A and the content B is high.

Further, the rarity level of the content A is high, and the rarity level of the content C is high. That is, only some maniacs know the content A and the content C. However, the relation between the content A and the content C itself is generally known (by maniacs). Because of this, the relation rarity level between the content A and the content C is lower.

That is, there is no correlation between a rarity level of content itself and a relation rarity level between pieces of content.

Here, examples of content having a lower rarity level include the following content/information.

(1) Comparatively universal content, which may be known by anyone, such as an official profile of an artist and items introduced in an official website of a TV program.

(2) Content high in generality, which many people may firstly access when they wish to know information of a field in general (for example, when they search for information by using a search engine).

(3) Objective information (the fact that an artist graduated from a certain school, etc.).

Further, examples of content having a middle rarity level include information, which is not out into the open in an official website of an artist but is out into the open in a website for members of his fan club.

Further, examples of content having a higher rarity level include the following information.

(1) Information, which is just uploaded to a blog by an artist himself.

(2) Information, which is out of print and is not promoted (secret revival, etc.).

(3) Subjective information (Favorite artist, artist to influence someone, etc.).

The relation rarity level will be described. Relation having a lower rarity level is, for example, relation between pieces of content having official linkage (program and its theme song, program and its original book, etc.).

Further, relation having a middle rarity level is, for example, relation between pieces of content having a lot of common meta-information, sharing an obvious common ground, and having no official linkage (many common casts, same production studio, same staffs, etc.).

Further, examples of relation having a higher rarity level include the following relation.

(1) Relation between pieces of content, of which meta-information involves no linkage (for example, pieces of meta-information include different names, respectively, which are aliases of single person in fact. The name of an artist himself is not written in relation to music, but in fact a group, to which the artist belonged before, sings the music.).

(2) Relation between pieces of content, which is likely to be a set in collaborative filtering of a user group that a system determined to have a high mania level, but which is not likely to be a set in collaborative filtering of a user group that a system determined to have a low mania level (for example, a system presents a recommendation message "people (whose mania level is high) who watch content A also watch content B." based on collaborative filtering. In this case, the relation rarity level between the content A and the content B is high).

Figure 5:
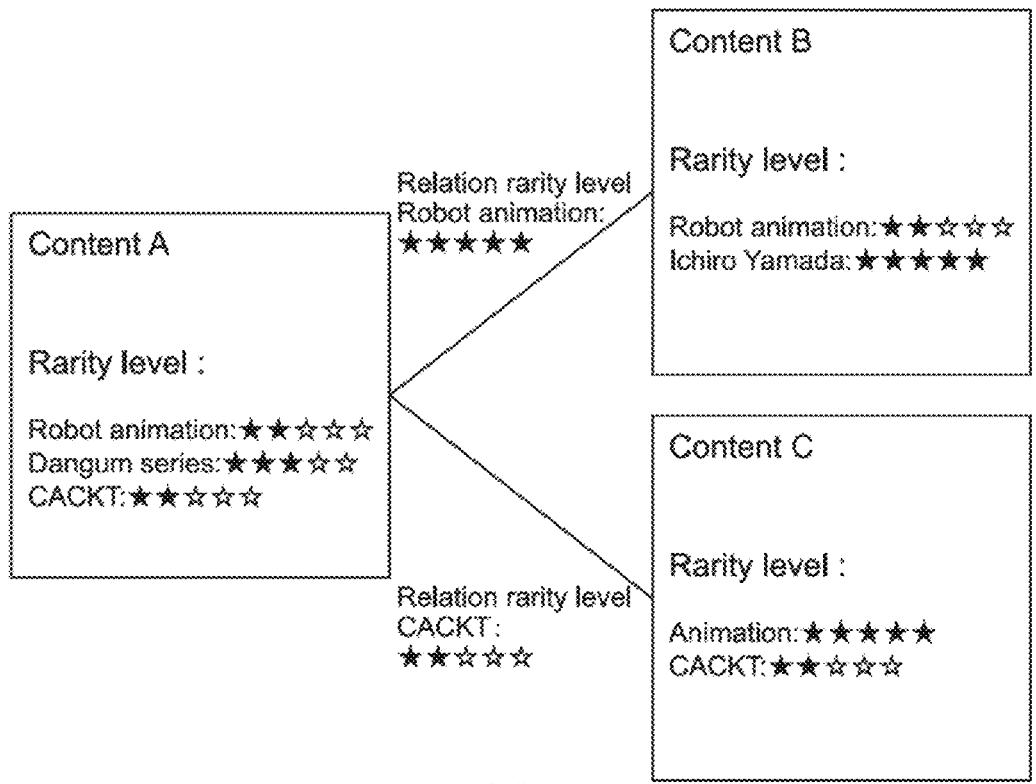
FIG. 5 is a diagram showing types of a rarity level described with reference to FIG. 4.

FIG. 5 is a diagram showing types of a rarity level described with reference to FIG. 4.

As shown in FIG. 5, a piece of content may have a plurality of types of rarity levels of content depending on its field as an attribute of the content. Similarly, two pieces of content may have a plurality of types of relation rarity levels between pieces of content depending on the field.

That is, there are a plurality of rarity levels for a plurality of types, respectively. Examples of the types include a genre of content (animation, foreign drama, medical documentary), a series (drama, animation, etc.), people in relation with content (casts, artists), and the like.

In the example of FIG. 5, the content A has the following rarity levels. That is, the content A has two stars in an attribute of robot animation, three stars in an attribute of Dangum series, and two stars in an attribute of CACKT. CACKT is an artist who sings its theme song.

Further, the content A and the content B have the common attribute, i.e., robot animation. This is little known in general. Because of this, the relation rarity level between the content A and the content B in relation to the attribute is five stars. Meanwhile, the content A and the content C have the common attribute, i.e., CACKT, who sings the theme song. This is known in relatively general. Because of this, the relation rarity level between the content A and the content C in relation to the attribute is two stars.

[Behavior of System]

Next, behaviors of the system configured as described above will be described. In this embodiment, the CPU of the ECG delivery server 100 and the respective software modules cooperatively execute the ECG delivery server 100. Here, the CPU controls and executes the respective software modules. The CPU of the ECG management server 300 and the respective software modules cooperatively execute the ECG management server 300. Here, the CPU controls and executes the respective software modules.

(Overall Behaviors of System)

Figure 6:
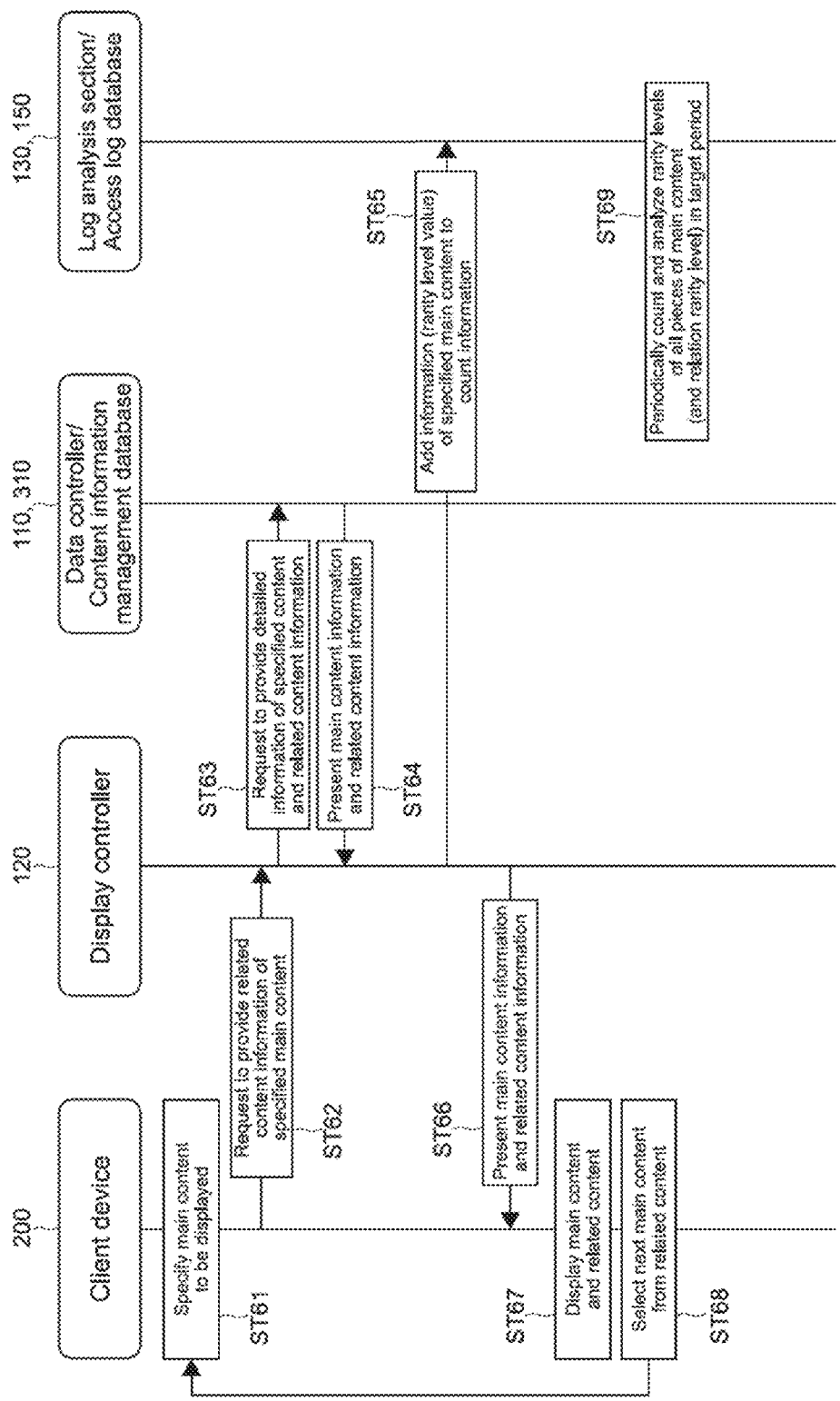
FIG. 6 is a flowchart roughly showing the flow of behaviors of the system of this embodiment.

FIG. 6 is a flowchart roughly showing the flow of behaviors of the system of this embodiment. In FIG. 6, content mainly displayed on an ECG unit is referred to as "main content". Content, which is displayed as content in relation to the main content, is referred to as "related content". Further, FIG. 6 shows the flow of data between one client device 200 and the ECG delivery server 100. In fact, there are many client devices 200 and users of the client devices 200.

As shown in FIG. 6, first, the client device 200 receives an operation to specify main content to be displayed from a user via a user interface, for example. The user interface is displayed on a browser of the client device 200 (Step 61).

The client device 200 requests the ECG delivery server 100 to provide related content information of the specified main content (Step 62).

The display controller 120 of the ECG delivery server 100 receives the request. Then, the display controller 120 requests the data controller 110 to provide detailed information of the specified content and related content information of the specified content (Step 63).

The data controller 110 receives the request. Then, the data controller 110 obtains detailed information of the main content and related content information from the content information management database 310. The data controller 110 presents the detailed information of the main content and the related content information to the display controller 120 (Step 64).

Next, the display controller 120 adds a rarity level value of the specified main content to the access log database 150 as counting information (Step 65). Let's say that, at this time, the client device 200 displays other content as main content before displaying the specified content. In this case, the display controller 120 also adds a relation rarity level between those pieces of content to the access log database 150.

Next, the display controller 120 presents the obtained main content information and the obtained related content information to the client device 200 (Step 66).

The client device 200 displays the presented main content and the presented related content on the display unit 26 (Step 67).

Next, the client device 200 receives an operation from a user. Here, the user selects the next main content from the related content (Step 68).

The main content is selected. In this case, the client device 200 repeats the behavior of Step 61. The behaviors of Step 62 and thereafter are repeated based on the behavior of Step 61.

Meanwhile, the log analysis section 130 periodically counts and analyzes rarity levels of all the pieces of main content, which the client device 200 displays (and relation rarity level between pieces of main content) (Step 69). Specifically, the log analysis section 130 calculates the distribution of the rarity levels of the pieces of main content, the average of the rarity levels, and the like. The log analysis section 130 creates an indicator (described below). The indicator indicates browse behavior (mania level) of users (group) based on the distribution, the average, and the like. The log analysis section 130 displays the indicator on the display unit of the ECG management server 300.

An operator of the ECG management server 300 browses the display result. The operator determines content, which is to be presented to a user of the client device 200 next (described below).

(Calculation Processing of Mania Level, and Content Presentation Processing Based Thereon)

Next, calculation processing of a mania level and content presentation processing based thereon will be described in detail. Here, the ECG delivery server 100 executes the content presentation processing.

Figure 7:
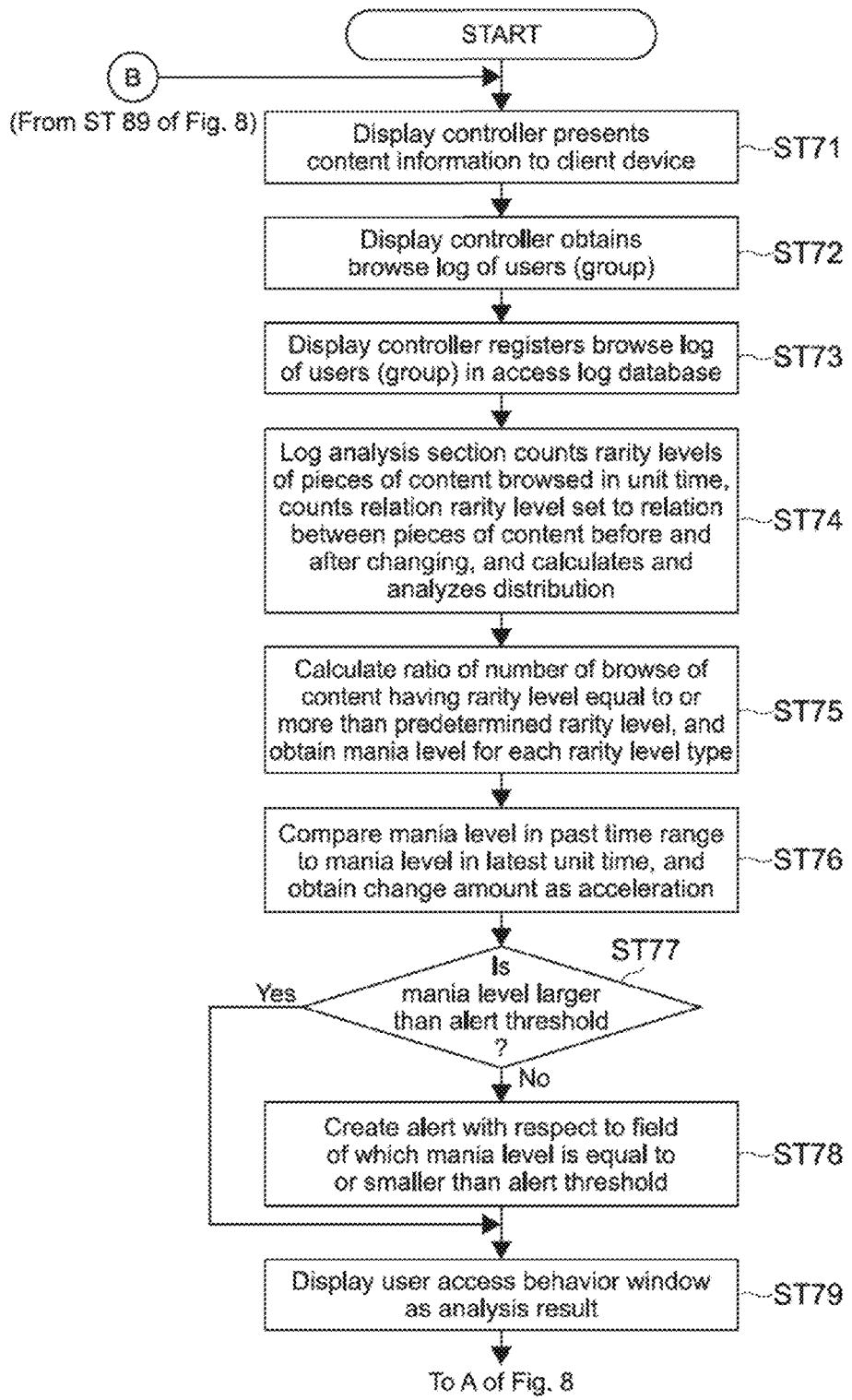
FIG. 7 is a flowchart showing the specific flow of behaviors of the system of this embodiment.
Figure 8:
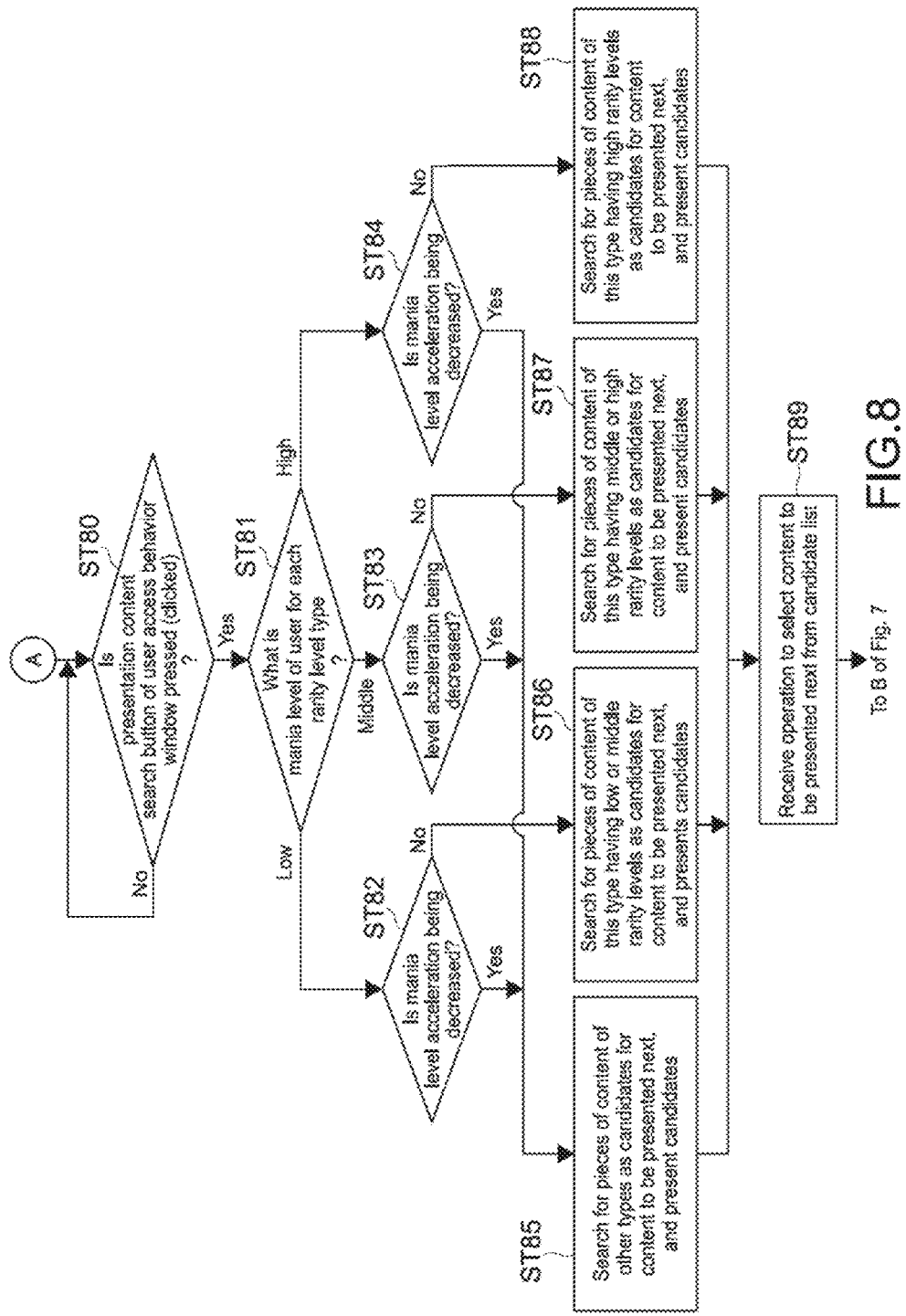
FIG. 8 is a flowchart showing the specific flow of behaviors of the system of this embodiment.

FIG. 7 and FIG. 8 are flowcharts showing the specific flows of the mania level calculation processing and the content presentation processing.

As shown in FIG. 7, first, the display controller 120 presents content information to the client device 200 (Step 71). The display controller 120 may present content information in the following situation. For example, a radio personality (operator of ECG management server 300) introduces the URL of a content unit (ECG unit), which relates to the theme of the radio program, to the listeners (users of client devices 200).

Next, the display controller 120 obtains a browse log of users (group) of the client devices 200 with respect to the presented content (Step 72). The display controller 120 registers the browse log in the access log database 150 (Step 73).

Next, the log analysis section 130 counts content rarity levels, which are set to pieces of content. The pieces of content are browsed (accessed) in predetermined unit time (for example, five minutes, ten minutes, thirty minutes, one hour, etc.). In addition, the log analysis section 130 counts a relation rarity level set to the relation between pieces of content before and after changing. The log analysis section 130 calculates and analyzes the distribution (Step 74).

Here, how to set the content rarity level and the relation rarity level will be described in detail.

Figure 9:
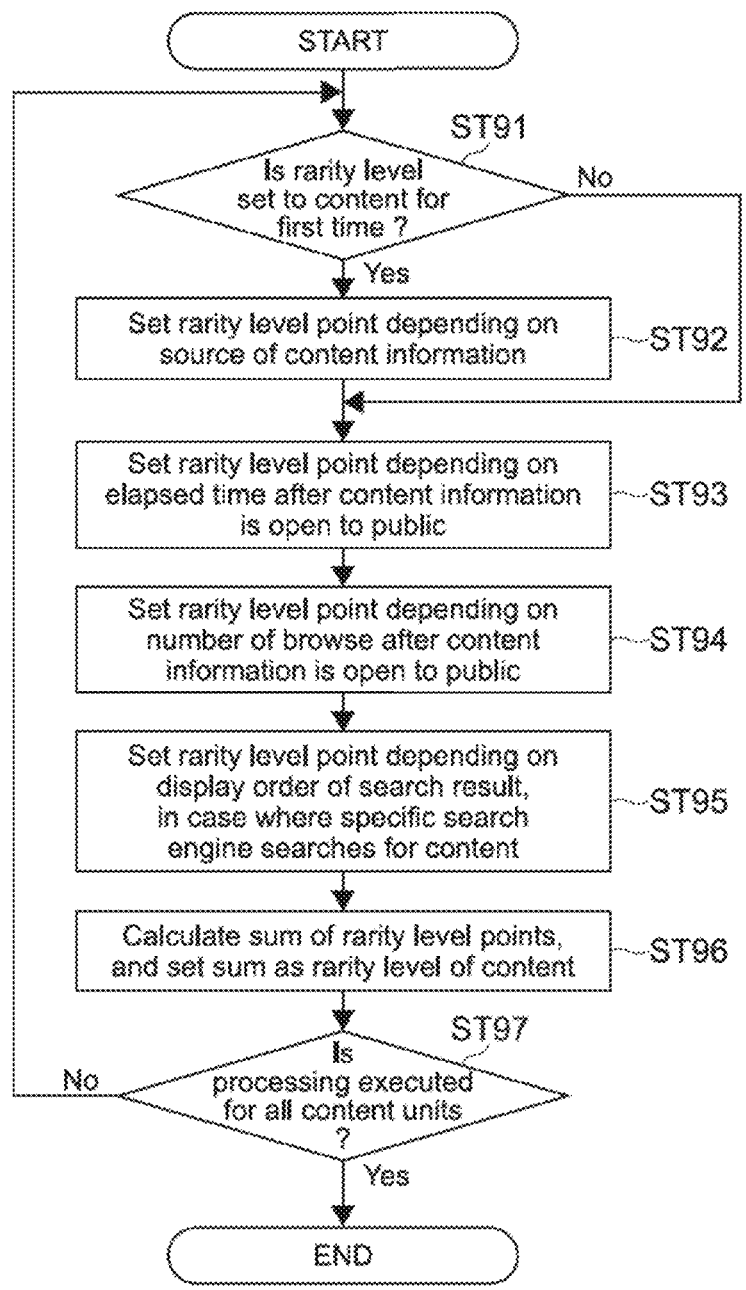
FIG. 9 is a flowchart showing the flow of the setting processing of a content rarity level of the system of this embodiment.

FIG. 9 is a flowchart showing the flow of the setting processing of a content rarity level. The setting processing is executed once a day (batch processing), for example. Alternatively, the setting processing may be executed every time the content provider 400 provides content.

As shown in FIG. 9, first, the association engine 320 determines if a rarity level is set to content, to which a rarity level is to be set, for the first time or not (Step 91).

The association engine 320 determines that a rarity level is set for the first time (Yes). In this case, the association engine 320 sets a rarity level point depending on a source of the target content (Step 92). For example, the target content is information on an official website supplied from the provider. In this case, the association engine 320 sets a lower rarity level point (for example, one point). Further, the content is information on a fan club website. In this case, the association engine 320 sets a middle rarity level point (for example, three points). Further, merely a personal blog introduces the content. In this case, the association engine 320 sets a high rarity level point (for example, five points).

Next, the association engine 320 sets a rarity level point depending on elapsed time after target content is open to the public (Step 93). That is, the shorter the elapsed time after the content is disclosed on the web, the higher the rarity level point that the association engine 320 sets. More specifically, the association engine 320 sets rarity level points as follows. The association engine 320 sets one point if the elapsed time after content is open to the public is three days or more. The association engine 320 sets three points if the elapsed time is one day or more and less than three days. The association engine 320 sets five points if the elapsed time is less than one day.

Next, the association engine 320 sets a rarity level point. The rarity level point depends on the number of browse after target content is open to the public (Step 94). That is, the smaller the number of browse (access) after the content is disclosed on the web, the higher the rarity level point that the association engine 320 sets. More specifically, the association engine 320 sets rarity level points as follows. The association engine 320 sets one point if the number of access is 100 or more. The association engine 320 sets three points if the number of access is 50 to 99. The association engine 320 sets five points if the number of access is 1 to 49.

Next, the association engine 320 sets a rarity level point. The rarity level point depends on the display order of a search result, in a case where a specific search engine searches for target content (Step 95). That is, in the case where the content is searched for, the lower the display order, the higher the rarity level point that the association engine 320 sets. More specifically, the association engine 320 sets rarity level points as follows. The association engine 320 sets one point if the display order is first to tenth. The association engine 320 sets three points if the display order is eleventh to 50th. The association engine 320 sets five points if the display order is 51st and thereafter. The association engine 320 sets ten points if the target content is not displayed (found) as a search result.

A rarity level point may be alternatively or additionally set from the viewpoint other than Steps 92 to 95.

Next, the association engine 320 calculates the sum of the rarity level points set in Steps 92 to 95. The association engine 320 sets the sum as the rarity level of the target content (Step 96).

Further, the association engine 320 may divide the sum of the points into a plurality of levels (for example, five stages, etc.) based on a predetermined absolute reference. More specifically, for example, the association engine 320 may set the levels as follows. The association engine 320 may set one star if the sum of the points is less than five points. The association engine 320 may set two stars if the sum of the points is five points or more and less than ten points. The association engine 320 may set three stars if the sum of the points is ten points or more and less than fifteen points. The association engine 320 may set four stars if the sum of the points is fifteen points or more and less than twenty points. The association engine 320 may set five stars if the sum of the points is twenty points or more.

Further, for example, the association engine 320 may compare the totals of the rarity level points of a plurality of pieces of content (distribution status). The association engine 320 may relatively and dynamically set a rarity level depending on the distribution status. More specifically, all the pieces of content are calculated at time of the above-mentioned batch processing. The association engine 320 ranks all the pieces of content based on the above-mentioned total points of the rarity level. Similar to the above, the association engine 320 may set five levels of rarity level (one star to five stars) depending on the ranks.

Next, the association engine 320 determines if the above-mentioned processing is executed for all the content units (ECG units) or not (Step 97). The association engine 320 determines that the processing is not executed for all the content units (No). In this case, the association engine 320 returns to Step 91, and repeats the processing thereafter. That is, the association engine 320 repeats the processing of Steps 91 to 96 for all the target content units and for the above-mentioned rarity level types (fields). As a result, the processing is finished. The content information management database 310 stores information on the set rarity levels.

Figure 10:
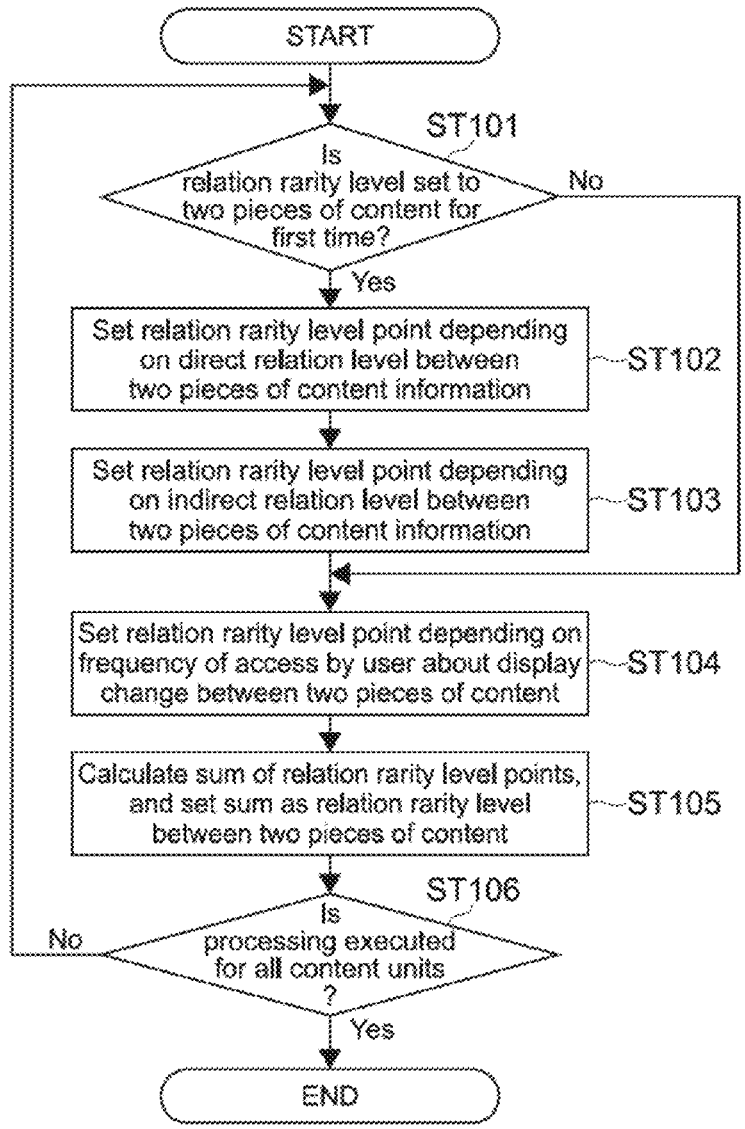
FIG. 10 is a flowchart showing the flow of the setting processing of a relation rarity level between pieces of content of the system of this embodiment.

FIG. 10 is a flowchart showing the flow of the setting processing of a relation rarity level between pieces of content. The setting processing is also executed once a day (batch processing), for example.

As shown in FIG. 10, first, the association engine 320 determines if a relation rarity level is set to two pieces of content, to which a relation rarity level is to be set, for the first time or not (Step 101).

The association engine 320 determines that a relation rarity level is set for the first time (Yes). In this case, the association engine 320 sets a relation rarity level point. The relation rarity level point depends on a direct relation level between two pieces of content (Step 102). Specifically, the smaller the number of metadata items common to the two pieces of content, the higher the relation rarity level point that the association engine 320 sets. For example, the association engine 320 sets the relation rarity level points as follows. The association engine 320 sets one point if the number of the common metadata items is five or more. The association engine 320 sets three points if the number of the common metadata items is two to four. The association engine 320 sets five points if the number of the common metadata items is one.

Next, the association engine 320 sets a relation rarity level point depending on indirect relation level between two pieces of content (Step 103).

Figure 11:
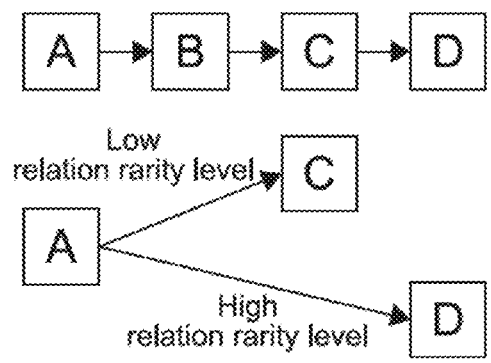
FIG. 11 is a diagram for explaining the concept of the setting processing of a content relation rarity level of the system of this embodiment.

Specifically, as shown in the upper portion of FIG. 11, for example, the (indirect) relation between four pieces of content (content A, B, C, and D) is referred to as "A>B>C>D" based on direct relation between the four pieces of content (common metadata item). That is, the content A is only in relation with the content B. The content B is in relation with the content A and the content C. The content C is in relation with the content B and the content D. The content D is only in relation with the content C. Here, the number of pieces of content between certain content and other content (excluding those two pieces of content) is referred to as "number of hops". In the example of FIG. 11, the number of hops between the content A and the content C is one. The number of hops between the content A and the content D is two.

In this case, the larger the number of hops between two pieces of target content, the higher the relation rarity level point that the association engine 320 sets. More specifically, the association engine 320 sets relation rarity level points as follows. The association engine 320 sets one point if the number of hops is two or less. The association engine 320 sets three points if the number of hops is three or four. The association engine 320 sets five points if the number of hops is five or more.

The processing of Step 103 is finished. Alternatively, the association engine 320 determines that a relation rarity level is set to two pieces of content not for the first time (Step 101). In those cases, the association engine 320 sets a relation rarity level point, which depends on the number of times of direct access between two pieces of target content (change between two pieces of target content) (Step 104).

That is, the smaller the number of times of direct access between two pieces of target content, the higher the relation rarity level point between the two pieces of content that the association engine 320 sets. Specifically, the association engine 320 sets relation rarity level points as follows. The association engine 320 sets one point if the number of times of direct access between two pieces of target content is 100 or more. The association engine 320 sets three points if the number of times of direct access between two pieces of target content is 50 to 99. The association engine 320 sets five points if the number of times of direct access between two pieces of target content is 1 to 49.

A relation rarity level point may be alternatively or additionally set from the viewpoint other than Steps 102 to 104.

Next, the association engine 320 calculates the sum of the relation rarity level points set in Steps 102 to 104. The association engine 320 sets the sum as the relation rarity level between two pieces of target content (Step 105).

Further, similar to the above-mentioned rarity level, the association engine 320 may divide the sum of the relation rarity level points into a plurality of levels (for example, five stages, etc.) based on a predetermined absolute reference. The association engine 320 may compare the total points of the relation rarity levels of a plurality of pieces of other content at time of the above-mentioned batch processing. The association engine 320 may relatively and dynamically divide relation rarity levels into a plurality of levels.

Next, the association engine 320 determines if the above-mentioned processing is executed for all the content units (ECG units) or not (Step 106). The association engine 320 determines that the processing is not executed for all the content units (No). In this case, the association engine 320 returns to Step 101, and repeats the processing thereafter. That is, the association engine 320 repeats the processing of Steps 101 to 105 for all the combinations of all the target content units and for the above-mentioned rarity level types (fields). As a result, the processing is finished. The content information management database 310 stores information on the set relation rarity levels.

With reference to FIG. 7 again, the log analysis section 130 calculates a mania level of users (group) with respect to a rarity level for each rarity level type (field). The mania level with respect to a rarity level is a ratio of the number of pieces of content, each of which has a rarity level equal to or more than a predetermined threshold, with respect to the number of all the pieces of content, which a plurality of users access in the unit time. Further, the log analysis section 130 calculates a mania level of users (group) with respect to a relation rarity level for each rarity level type. The mania level with respect to a relation rarity level is a ratio of the number of content sets, each of which has a relation rarity level equal to or more than a predetermined threshold, with respect to the number of all the pieces of content, which a plurality of users access in the unit time. Further, the log analysis section 130 obtains the sum or the average of the above-mentioned two mania levels as a mania level of users (group) of the rarity level type (Step 75). This mania level is a static mania level for each unit time, different from mania level acceleration (described below).

Next, the log analysis section 130 compares a mania level of users (group) in a past time range (e.g., previous unit time, etc.) to the latest mania level of the users (group). As a result, the log analysis section 130 obtains the change amount (differential) as mania level acceleration (Step 76).

Next, the log analysis section 130 determines if the static mania level for each unit time is larger than a predetermined alert threshold. The log analysis section 130 determines if the mania level acceleration is larger than a predetermined alert threshold (Step 77).

The log analysis section 130 determines that the static mania level is equal to or less than the predetermined alert threshold. Alternatively, the log analysis section 130 determines that the mania level acceleration is equal to or less than the predetermined alert threshold (Step 77, No). In those cases, the log analysis section 130 creates alert information with respect to a field of a target of calculation of the mania level (Step 78).

Further, the log analysis section 130 creates a user access behavior window. The user access behavior window includes indicators showing analysis results. The indicator indicates a mania level of users (group) for each field. The log analysis section 130 displays the user access behavior window on the display unit (Step 79). The user access behavior window for the static mania level is created. The user access behavior window for the mania level acceleration is also created. An operator of the ECG management server 300 browses and controls the user access behavior windows.

Figure 12:
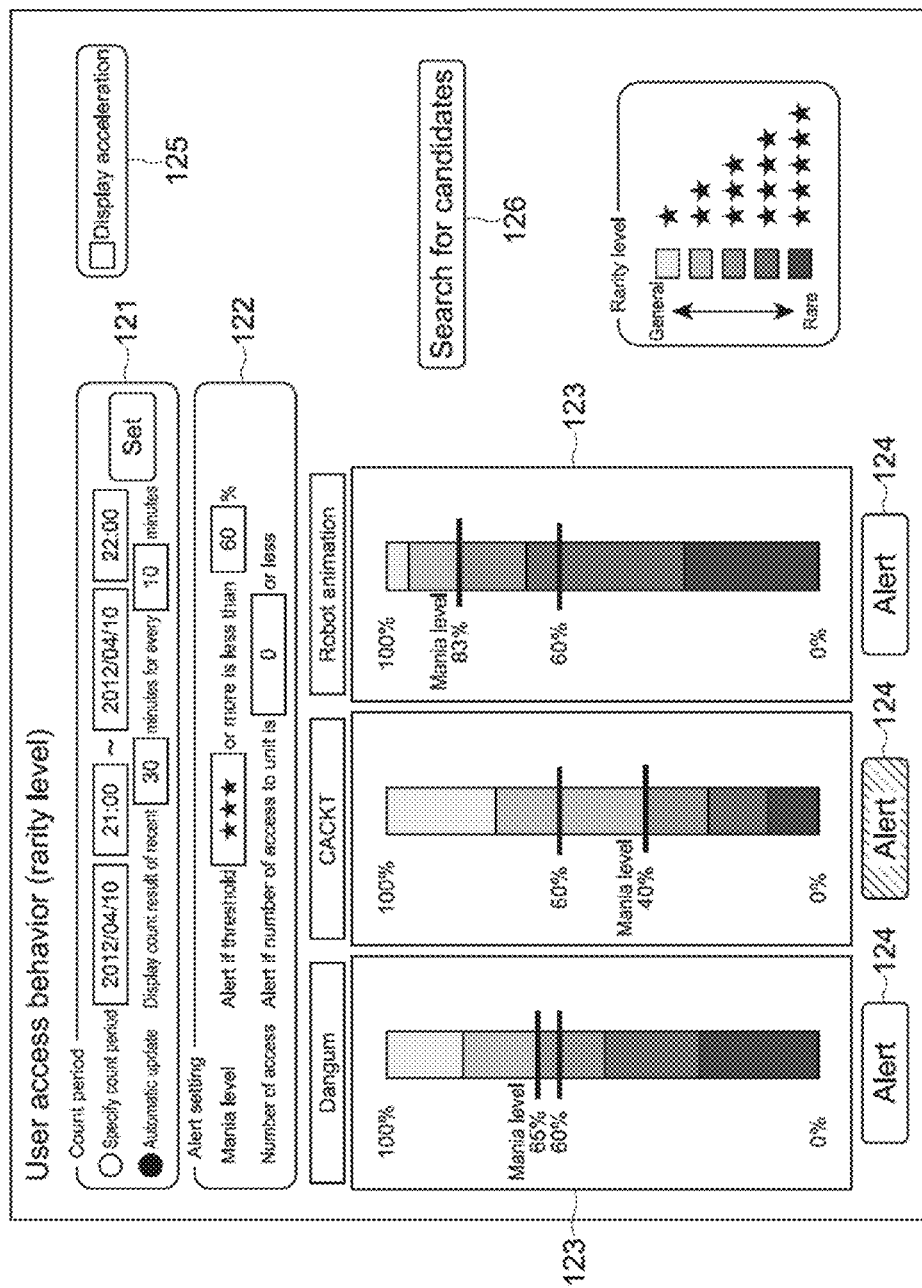
FIG. 12 is a diagram showing a display example of the user access behavior window showing a mania level of a user, which is calculated based on a rarity level and based on a relation rarity level counted in this embodiment.

FIG. 12 is a diagram showing a display example of the user access behavior window showing the static mania level.

As shown in FIG. 12, the user access behavior window includes user interfaces, i.e., a count period setting UI 121, an alert setting UI 122, mania level display UIs 123, alert display UIs 124, an acceleration display setting UI 125, and a presentation content search button 126.

The count period setting UI 121 is used to select one of to manually specify a count period of user access behavior (mania level) by an operator, and to automatically update the count period every predetermined period. In the case where the count period is manually specified, an operator inputs start date/time and end date/time of a count period in input boxes, and presses (clicks) a set button on the right side. Then, user access behavior in the input period is displayed. In the case of automatic updating, an operator inputs a count period and the update frequency in input boxes, and presses (clicks) the set button on the right side. Then, user access behavior in the count period is updated and displayed based on the update frequency.

The alert setting UI 122 is used to set a mania level and the number of access. The mania level and the number of access are triggers to display an alert on the user access behavior window. With regard to the mania level, an operator inputs a threshold (for example, the number of stars) of a rarity level and a threshold of a mania level in input boxes. The threshold of a rarity level is necessary to calculate the mania level. The threshold of a mania level is a criterion of alert display. Further, with regard to the number of access, an operator inputs the number of access to a content unit from the client device 200 in an input box. Specifically, the operator inputs a threshold of the number of access. The threshold of the number of access is a criterion of alert display.

The mania level display UI 123 is an area in which distributions of rarity level points of a plurality of users for each rarity level type, and indicators of mania levels are displayed. In FIG. 12, for example, distribution of rarity levels and a mania level are displayed for each of the three rarity level types.

In the example of FIG. 12, the mania level of the rarity level type "CACKT" is low, because a group of users having low rarity level points is large. Meanwhile, the mania level of the rarity level type "robot animation" is high, because a group of users having high rarity level points is large.

The alert display UI 124 is an icon displayed below the mania level display UI 123, for example. If a value falls down below the threshold set in the alert setting UI 122, the display mode of the alert display UI 124 changes. For example, the color of the icon changes to an eye-catching color, e.g., red or the like. Alternatively, the icon blinks.

The acceleration display setting UI 125 is used to select if the mania level acceleration is displayed or not. For example, the acceleration display setting UI 125 displays a check box. By default, the check box of the user access behavior window is off. If the check box is on, the display mode of the mania level display UI 123 turns to the acceleration display.

The presentation content search button 126 is used to search for content, which is to be presented to a user of the client device 200 next, based on mania levels displayed on the mania level display UIs 123. If the button is pressed (clicked), pieces of presentation candidate content (list of pieces of content) are displayed depending on mania levels at this time for each rarity level type (described below).

Figure 13:
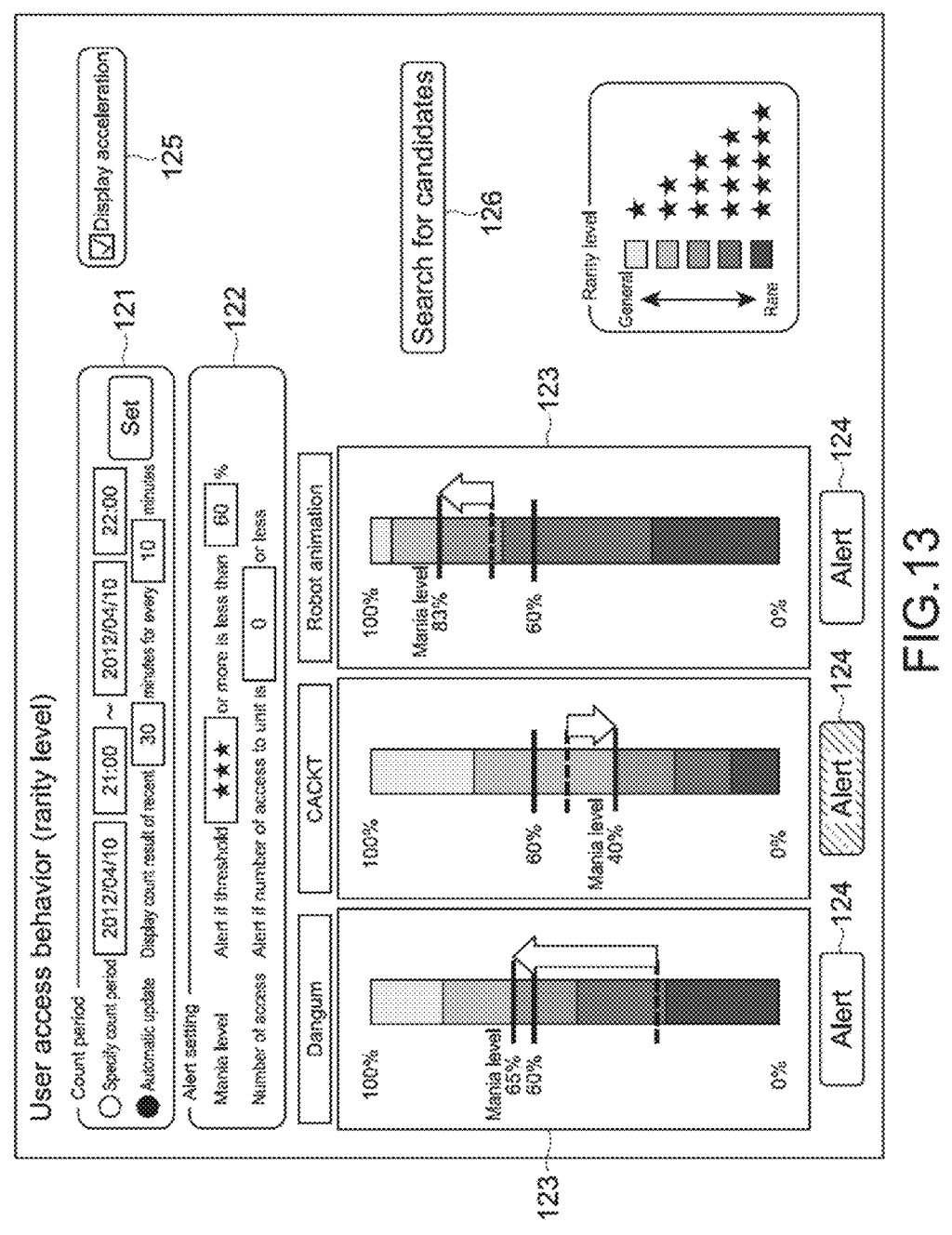

FIG. 13 is a diagram showing a display example of the user access behavior window showing the mania level acceleration. As described above, this window is displayed if the check box of the acceleration display setting UI 125 is on.

As shown in FIG. 13, the window is different from the window of FIG. 12 only in that the display mode of the mania level display UIs 123 is changed. That is, the mania level display UI 123 of this window shows acceleration by using the direction and the length of an arrow, for example. The acceleration shows the change amount of mania levels between the previous unit time and the present unit time. In the example of FIG. 13, the mania level of the rarity level type "Dangum" is increased greatly. Meanwhile, the mania level of the rarity level type "CACKT" is being decreased slightly.

Because of this, an operator may visually recognize reaction of a group of users of a specific field (rarity level type), who browse the recently-presented content.

(How to Recommend Content Based on Mania Level)

Next, content presentation processing after the user access behavior window is displayed will be described.

As shown in FIG. 8, the association engine 320 of the ECG management server 300 determines if the presentation content search button 126 of the user access behavior window is pressed (clicked) or not (Step 80).

The association engine 320 of the ECG management server 300 determines that the presentation content search button 126 is pressed (clicked) (Yes). In this case, the association engine 320 determines if the mania level of a user is high (for example, four stars or more), middle (for example, three stars), or low (for example, two stars or less) for each rarity level type corresponding to an indicator displayed on the user access behavior window (Step 81).

Next, the association engine 320 determines if a mania level is being decreased or not based on the mania level acceleration (Steps 82, 83, 84).

The association engine 320 determines that the mania level is low and the acceleration is being decreased (Step 82, Yes). In this case, the association engine 320 searches the content information management database 310 for pieces of content of other types as candidates for content to be presented next. The association engine 320 presents a list of the candidates (Step 85). The reason is as follows. The user may not be interested in content of this type. The user may not be interested in content in the future even if content of this type is further recommended.

The association engine 320 determines that the mania level is low and the acceleration does not change or is being increased (Step 82, No). In this case, the association engine 320 searches for pieces of content of this type having low or middle rarity levels as candidates for content to be presented next. The association engine 320 presents a list of the candidates (Step 86). The reason is as follows. The user is not so much interested in content of this type now. However, the user may be more interested in content of this type in the future. Because of this, it is desirable to present somewhat general (low rarity level) content at first, and then to gradually increase a rarity level of content to be presented.

The association engine 320 determines that the mania level is middle and the acceleration is being decreased (Step 83, Yes). In this case, the association engine 320 searches the content information management database 310 for pieces of content of other types as candidates for content to be presented next (Step 85). The reason is as follows. The user is somewhat interested in content of this type. However, the interest level is being decreased. Because of this, the user may not be interested in content of this type again in the future even if content of this type is further recommended.

The association engine 320 determines that the mania level is middle and the acceleration does not change or is being increased (Step 83, No). In this case, the association engine 320 searches for pieces of content of this type having middle or high rarity levels as candidates for content to be presented next. The association engine 320 presents a list of the candidates (Step 87). The reason is as follows. The user is somewhat interested in content of this type. The user may be more interested in content of this type in the future. Because of this, it is desirable to recommend pieces of content having higher rarity levels.

The association engine 320 determines that the mania level is high and the acceleration is being decreased (Step 84, Yes). In this case, the association engine 320 searches the content information management database 310 for pieces of content of other types as candidates for content to be presented next. The association engine 320 presents a list of the candidates (Step 85). The reason is as follows. The user is very interested in content of this type. However, the interest level is being decreased. Because of this, the user may not be interested in content of this type again in the future even if content of this type is further recommended.

The association engine 320 determines that the mania level is high and the acceleration does not change or is being increased (Step 84, No). In this case, the association engine 320 searches for pieces of content of this type having high rarity levels as candidates for content to be presented next. The association engine 320 presents a list of the candidates (Step 88). The reason is as follows. The user is very interested in content of this type. The user may be interested in content having a higher rarity level in the future.

An operator inputs an operation to select one piece of content from the content candidates in the list presented in Steps 85 to 88. Then, the association engine 320 receives the operation (Step 89). The association engine 320 instructs the data controller 110 to present the content to the user.

Hereinafter a specific example of content recommendation processing depending on mania levels will be described.

Figure 14:
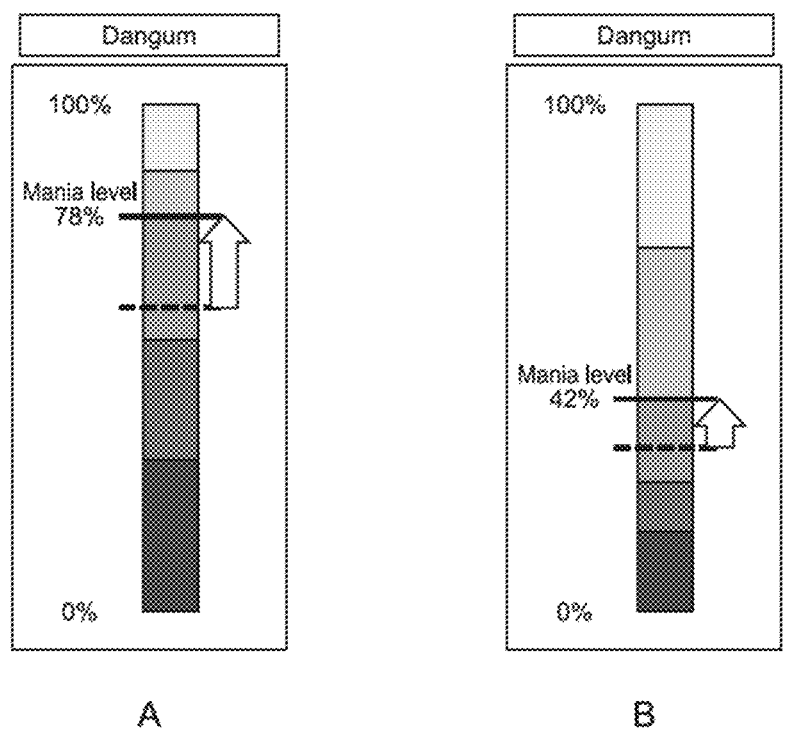
FIG. 14 is a diagram for comparing a mania level of a user to a mania level of another user calculated in this embodiment.

FIG. 14 is a diagram showing mania levels of users about content of a specific rarity level type (field), in which the mania level of a user is compared to the mania level of another user. As shown in A of FIG. 14, the mania level of a user A about content of this rarity level type is high (78%). However, as shown in B of FIG. 14, the mania level of a user B is low (42%). The mania level acceleration of the user A is large, and is being increased. The mania level acceleration of the user B is being increased slightly.

Figure 15:
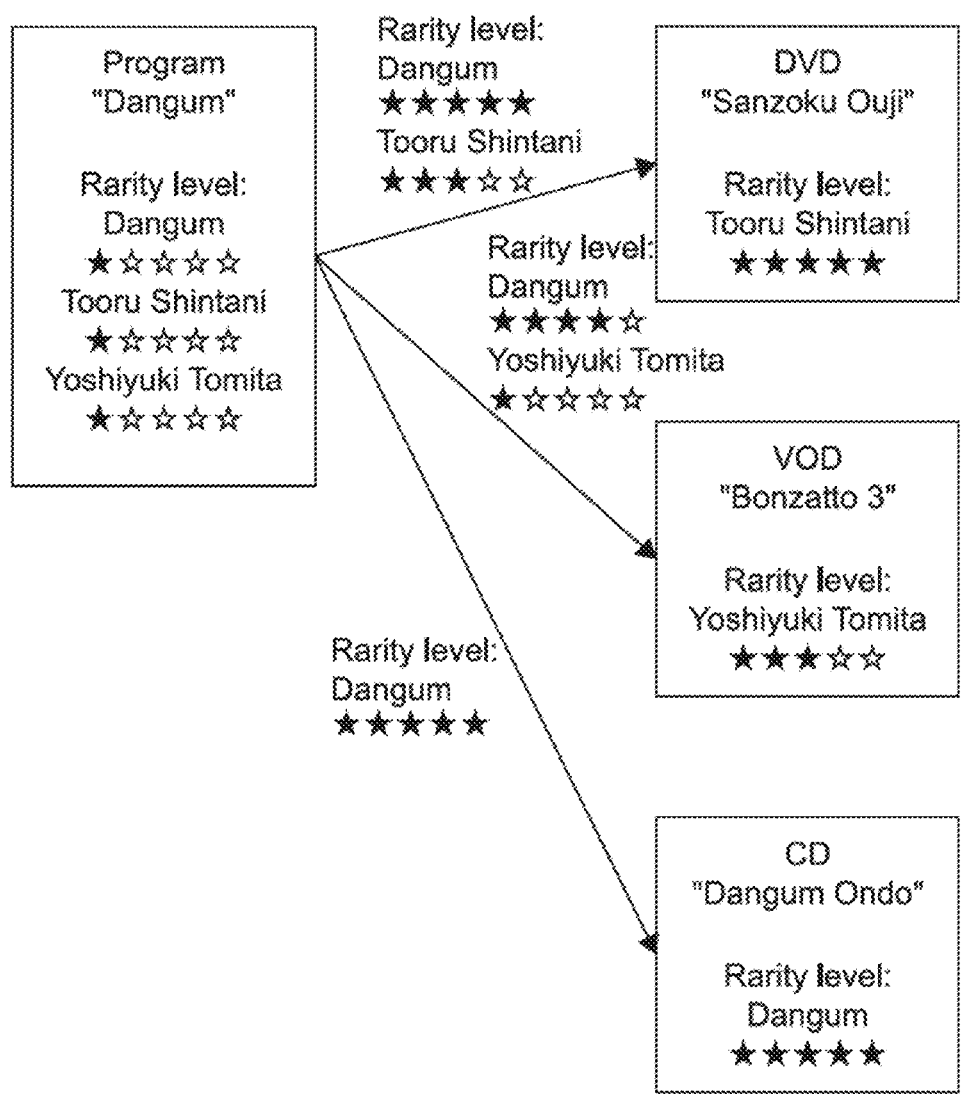
FIG. 15 is a diagram showing an example of content, which are to be presented to the user A of FIG. 14.

FIG. 15 is a diagram showing an example of content candidates, which are to be presented to the user A of FIG. 14 for next time. Further, FIG. 16 is a diagram showing an example of content candidates, which are to be presented to the user B of FIG. 14 for next time.

As shown in FIG. 15, the mania level and the acceleration of the user A are high. Pieces of content having high rarity levels are presented to the user A as candidates.

Figure 16:
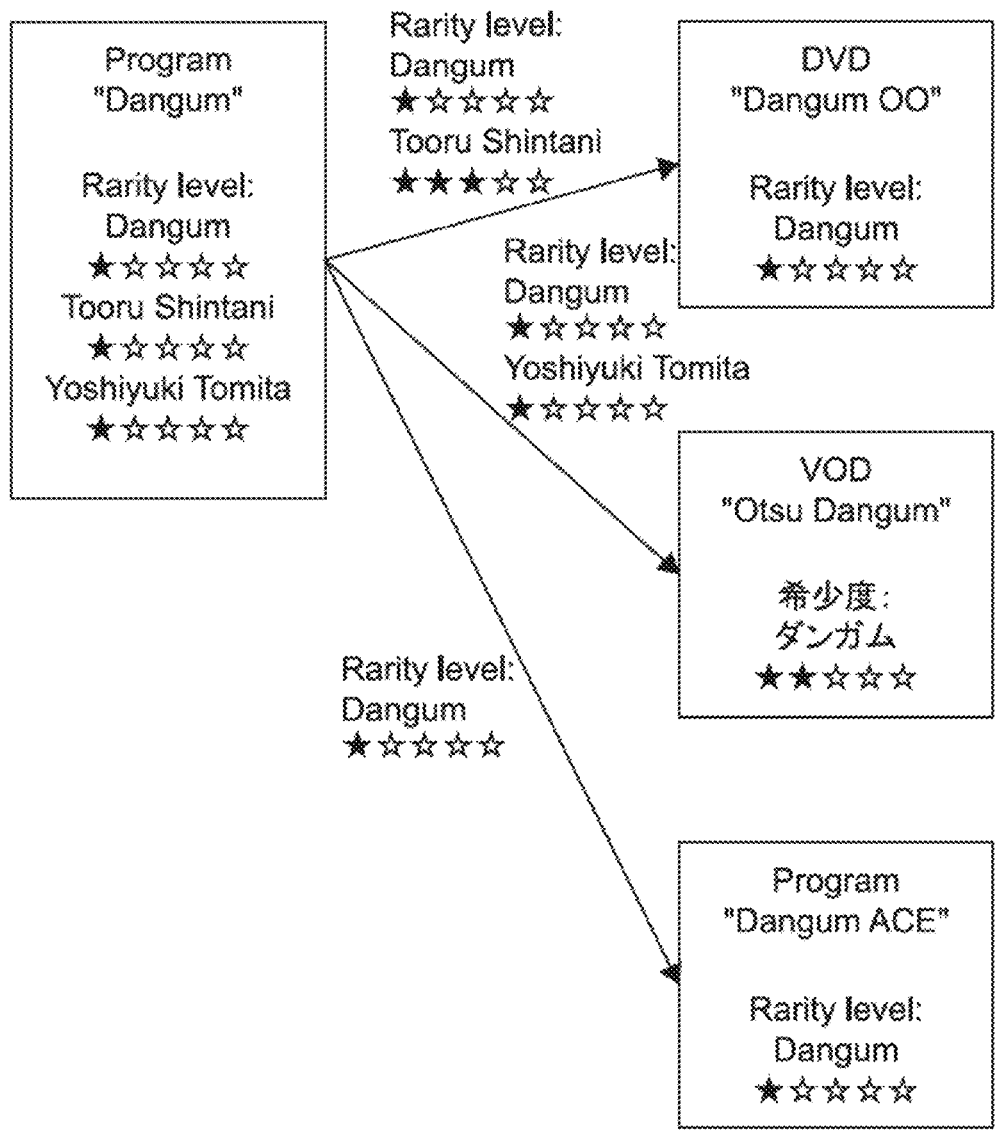
FIG. 16 is a diagram showing an example of content, which are to be presented to the user B of FIG. 14.

Meanwhile, as shown in FIG. 16, the mania level of the user B is low, and the acceleration of the user B is being increased. Pieces of content having low rarity levels are presented to the user B as candidates.

(User Interfaces of Client Device)

In FIG. 12 and FIG. 13 (described above), the user access behavior window shows indicators of mania levels of a user. An operator of the ECG management server 300 is capable of browsing the indicators. In addition, a user of the client device 200 may be capable of seeing the similar indicators.

Figure 17:
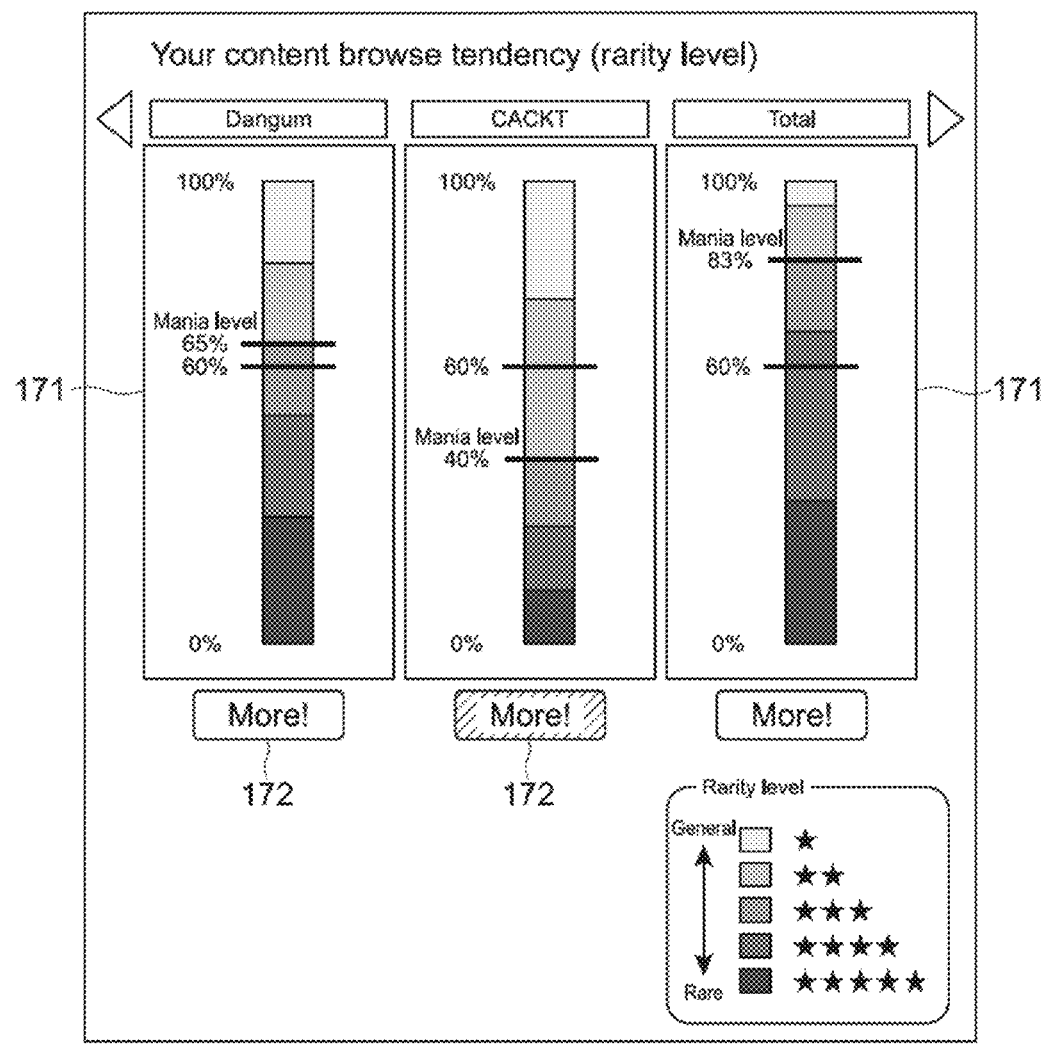
FIG. 17 is a diagram showing a display example of an indicator of a mania level, which a user of the client device may browse in this embodiment.

FIG. 17 is a diagram showing a display example of a user content browse tendency window, which is displayed on the client device.

As shown in FIG. 17, the content browse tendency window includes mania level display UIs 171 and additional search buttons 172.

Similar to the mania level display UI 123 of the user access behavior window, the mania level display UI 171 displays distribution of a rarity level for each rarity level type, and a mania level.

Figure 18:
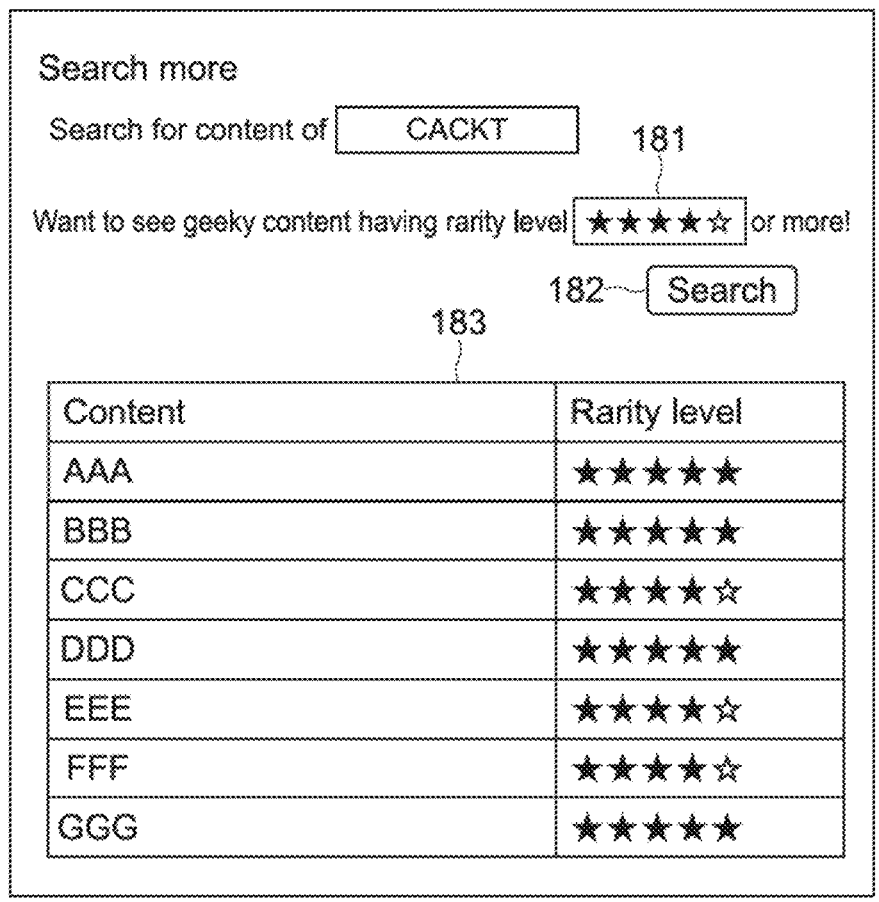
FIG. 18 is a diagram showing an example of a search window, which is displayed in a case where an additional search button of FIG. 17 is pressed (clicked)

The additional search button 172 is used to display related content depending on the mania level displayed on the mania level display UI 171. FIG. 18 is a diagram showing an example of a search window, which is displayed in a case where the additional search button 172 of FIG. 17 is pressed (clicked).

A user of the client device 200 wishes to browse other related content corresponding to his mania level (for example, he wishes to increase the mania level of a specific field). In this case, the user presses (clicks) the additional search buttons 172.

The user presses (clicks) the additional search buttons 172. Then, the client device 200 displays a related content search window of FIG. 18. The related content search window includes a rarity level set box 181, a search button 182, and a related content list 183.

The rarity level set box 181 displays stars, for example. By default, the number of the stars corresponds to a rarity level. The rarity level corresponds to a mania level, which is displayed on the mania level display UI 171 of FIG. 17. A user operates the box, to thereby set a related rarity level of content.

A user presses (clicks) the search button 182. In this case, the related content list 183 is displayed. Content names and rarity levels of the content are displayed on the list. A user inputs an operation to select one piece of content from the list. The client device 200 receives the operation. Then, the client device 200 displays information on the selected content.

Content may be extracted by means of an algorithm similar to the algorithm of FIG. 8, and the content name may be displayed on the related content list 183. Alternatively, a simpler algorithm may be used. That is, the client device 200 may search for related content based on a keyword. The keyword is a field (for example, "CACKT" of FIG. 17) of which additional search buttons 172 is pressed (clicked). Pieces of related content may be extracted from the search result. The rarity level of each of the pieces of related content is equal to or larger than the set rarity level. A list of the pieces of related content may be displayed.

As described above, according to this system, the ECG delivery server 100 is capable of automatically presenting related content to a user of the client device 200 depending on his mania level. In addition, a user is capable of searching for related content voluntarily.

[Conclusion]

As described above, the system of this embodiment uses the concept "rarity level of content" and the concept "relation rarity level between pieces of content". The system is capable of calculating a mania level of users (group) based on history of access to content by users, based on the rarity level of the content, and based on the relation rarity level of the content. The system is capable of outputting the mania level. Further, the system searches for content, which is to be presented to a user, depending on the mania level. As a result, an operator of the system is capable of understanding a rarity level of content, which a user wants. Further, the operator changes content, which is recommended to a user, depending on the rarity level. As a result, interest (mania level) of a user in the content may be increased. Further, interest of a user in content of a different type may be increased.

Modification Examples

It should be understood by those skilled in the art that various modifications, combinations, sub-combinations and alterations may occur depending on design requirements and other factors insofar as they are within the scope of the appended claims or the equivalents thereof.

Modification Example 1

In the above-mentioned embodiment, the sum or the average of a mania level of a rarity level of content and a mania level of a relation rarity level between pieces of content is displayed as a mania level of a user. Alternatively, a mania level of a content rarity level and a mania level of a relation rarity level between pieces of content may be displayed independent of each other.

Figure 19:
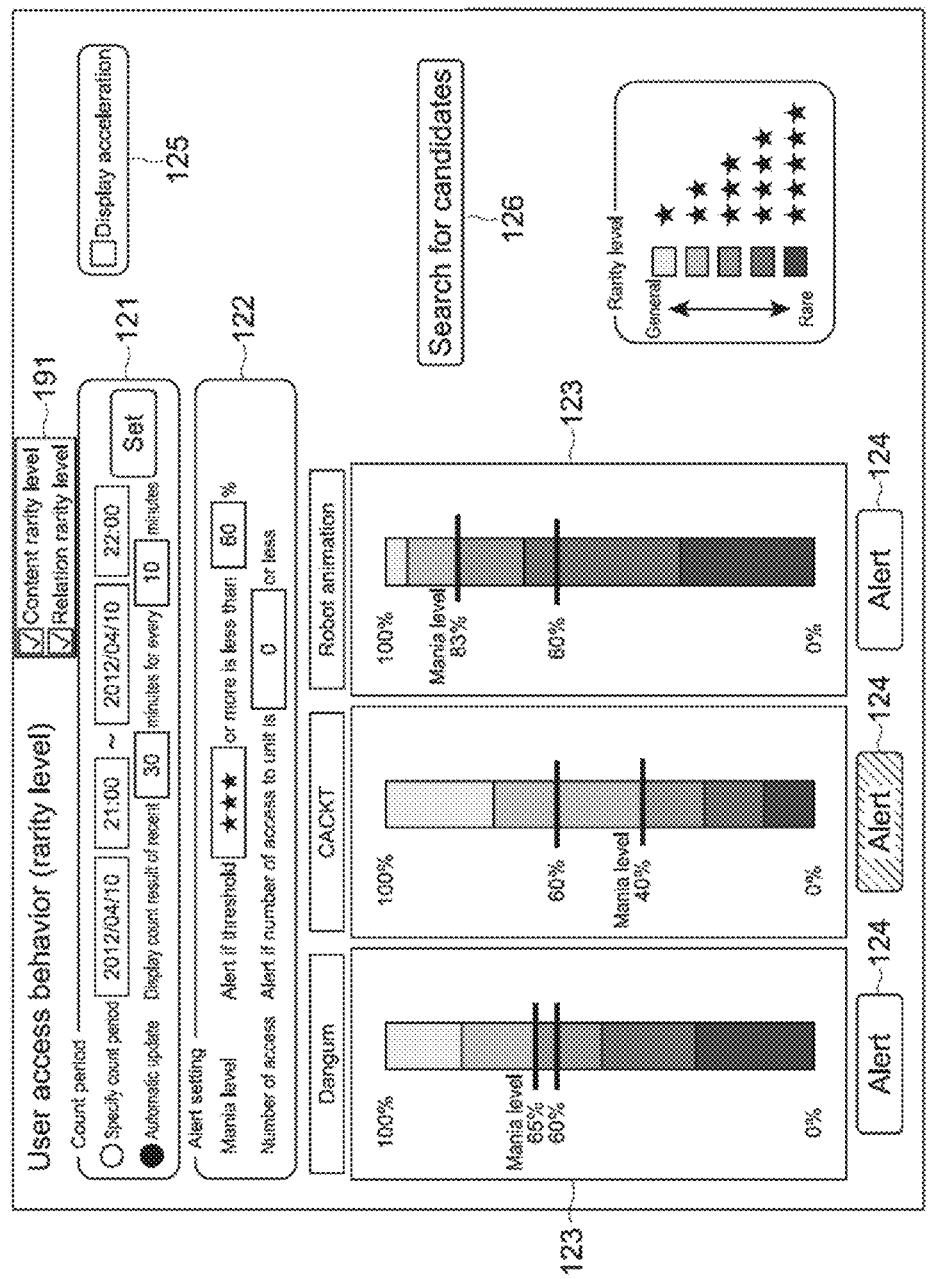
FIG. 19 is a diagram showing a display example of a user access behavior window according to a first modification example of the present technology.
Figure 20:
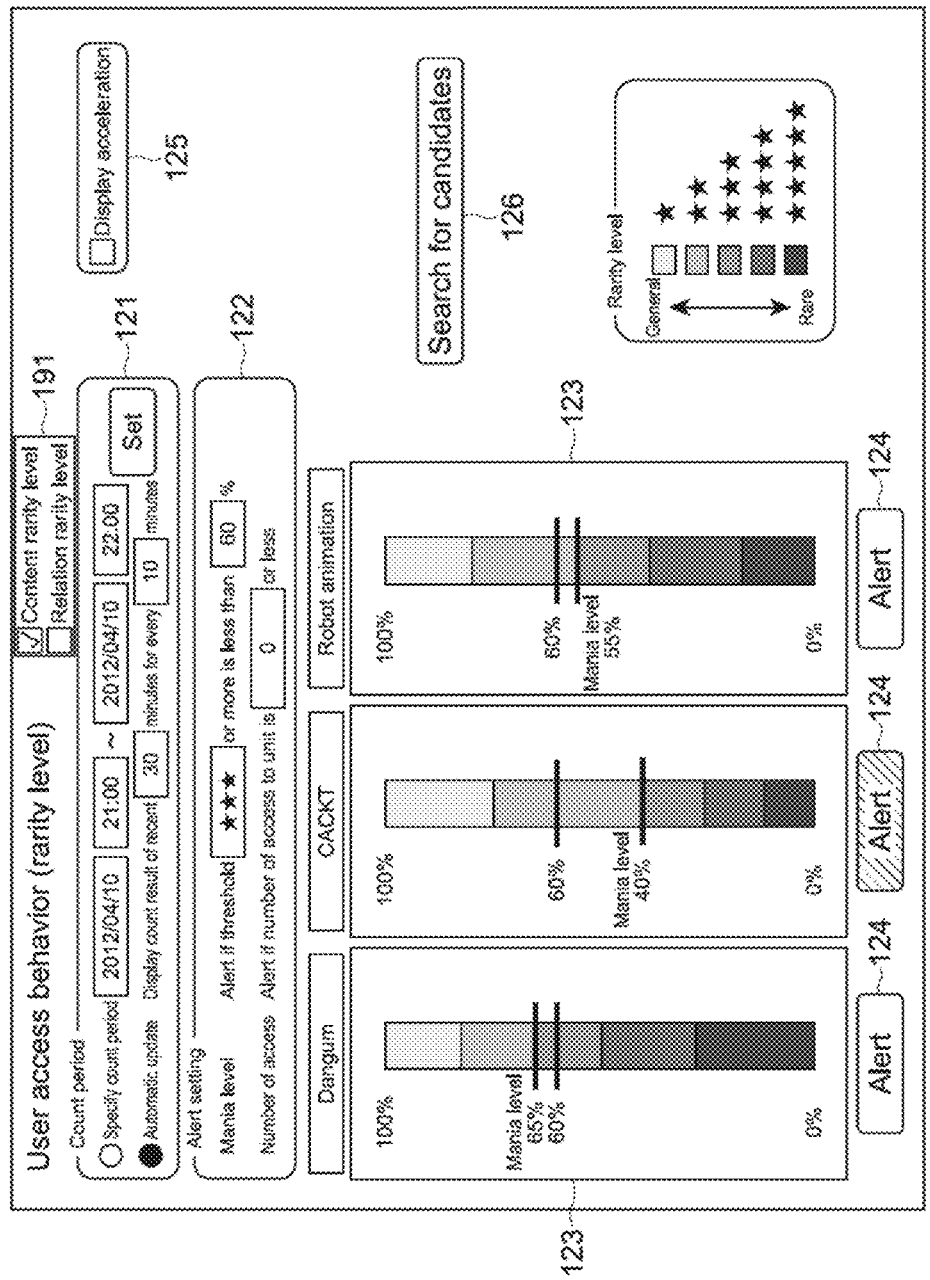
FIG. 20 is a diagram showing another display example of the user access behavior window according to the first modification example of the present technology.
Figure 21:
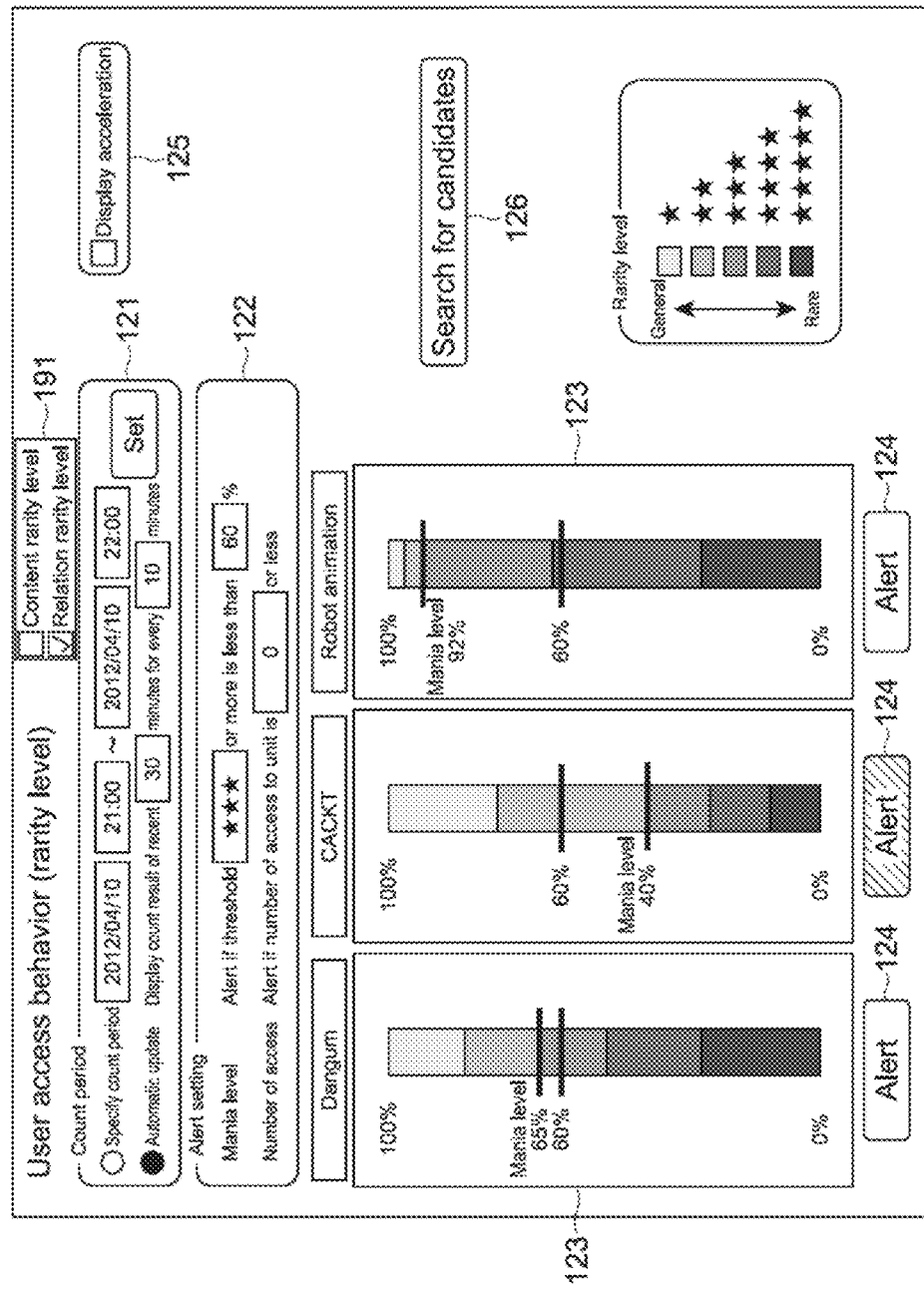
FIG. 21 is a diagram showing another display example of the user access behavior window according to the first modification example of the present technology.

Each of FIG. 19, FIG. 20, and FIG. 21 is a diagram showing a display example of a user access behavior window, which is displayed in this modification example. As shown in FIG. 19, FIG. 20, and FIG. 21, the user access behavior window of this modification example is different from the window of FIG. 12 and FIG. 13 as follows. That is, the user access behavior window of this modification example includes a rarity level count target setting UI 191.

The rarity level count target setting UI 191 includes check boxes, which are used to select how to calculate a mania level of a user. Specifically, calculation only based on a content rarity level, calculation only based on a relation rarity level between pieces of content, or calculation based on both rarity levels, may be selected.

FIG. 19 shows a case where both rarity levels are selected. In this case, similar to the above-mentioned embodiment, an operator is capable of understanding an overall mania level of a user.

FIG. 20 shows a case where only a content rarity level is selected. In this case, an operator is capable of understanding a level of a user, who sticks to rarity of content. For example, the window of FIG. 20 displays the mania level of the rarity level type "robot animation", which is lower than the mania level displayed on the window of FIG. 19. It means the following fact. Users (group) are more interested in rarity of the content itself than rarity of relation between pieces of content in the rarity level type.

The presentation content search button 126 is pressed (clicked) in this case. Then, the association engine 320 searches for related content based on the tendency.

FIG. 21 shows a case where only a relation rarity level between pieces of content is selected. In this case, an operator is capable of understanding a level of a user, who sticks to rarity of relation between pieces of content rather than rarity of content. For example, the window of FIG. 21 displays the mania level of the rarity level type "robot animation", which is higher than the mania level displayed on the window of FIG. 19. It means the following fact. Users (group) are more interested in rarity of relation between pieces of content than rarity of the content itself in the rarity level type.

Modification Example 2

In the above-mentioned embodiment, pieces of related content are presented to the client device 200 based on mania levels. For example, as shown in FIG. 18, the pieces of related content are displayed as a list. The list includes titles and rarity levels (the number of stars) of the pieces of related content. Alternatively, related content may be displayed in the following display mode. That is, related content may be displayed depending on a relation rarity level between the related content and main content.

Figure 22:
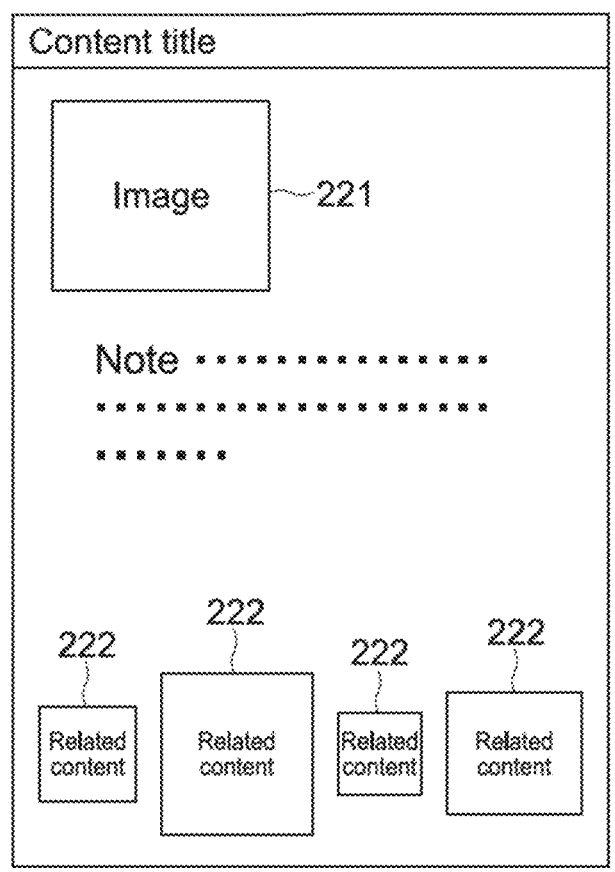
FIG. 22 is a diagram showing an example of an interface on a related content recommendation window, which is displayed on a client device of a second modification example of the present technology.

FIG. 22 is a diagram showing an example of an interface on a related content recommendation window, which is displayed on the client device 200 of the modification example. As shown in FIG. 22, the interface displays main content information 221 on the upper portion, and icons 222 on the lower portion. The icons 222 indicate a plurality of pieces of related content information, respectively. The icons are displayed in different sizes depending on relation rarity levels between main content and pieces of content, respectively.

For example, the higher the relation rarity level between related content and main content, the larger the size of the icon 222 of the related content that the display controller 120 may set, and vice versa. In other words, the lower the relation rarity level between related content and the main content, the smaller the size of the icon 222 of the related content that the display controller 120 may set, and vice versa.

Further, the display controller 120 may dynamically change the size of the icon 222 depending on mania levels of users. That is, the higher the mania level of a user, the larger the size of the icon 222 of content set on the interface, of which relation rarity level between the content and main content is higher. To the contrary, the lower the mania level of a user, the larger the size of the icon 222 of content set on the interface, of which relation rarity level between the content and main content is lower.

Further, the display controller 120 may change the size of the icon 222 not depending on a relation rarity level between related content and main content, but depending on a rarity level of related content itself.

Further, the display controller 120 may not change the size of an icon depending on a content rarity level or a relation rarity level. Instead, the display controller 120 may change the alignment sequence of icons depending on a content rarity level or a relation rarity level. That is, the higher a relation rarity level between content and main content, the higher the rank of the icon 222 displayed on a content (icon) list. Alternatively, the higher a content rarity level of content, the higher the rank of the icon 222 displayed on the content (icon) list. Further, display order of the icons 222 of pieces of related content may be dynamically changed depending on mania levels of users. For example, the higher the content rarity level of content, the higher the rank of the icon 222 displayed on a content (icon) list on the interface of a user whose mania level is higher. Alternatively, the higher the relation rarity level between content and main content, the higher the rank of the icon 222 displayed on a content (icon) list on the interface of a user whose mania level is higher.

Further, a content rarity level or a relation rarity level may be expressed not only by means of the size or the display order of an icon, but also by means of other display modes. Examples of the display modes include the color of an icon, presence/absence of a marker, and the like.

Modification Example 3

In the above-mentioned embodiment, mania levels of all the pieces of content, which a plurality of users access in a unit time, are calculated. However, mania levels of all the pieces of content may not be calculated. Alternatively, mania levels of some (predetermined number or more) pieces of content, the number of which is enough to calculate mania levels, may be calculated. For example, the number of access to content by a plurality of users in a unit time is 10000. In this case, 1000 times of access out of 10000 times of access may be used to calculate mania levels. As the result of this processing, the calculation amount by the ECG delivery server 100 or the ECG management server 300 is reduced.

Modification Example 4

In the above-mentioned embodiment, mania levels are calculated based on an access log of users (group). Alternatively, mania levels may be calculated based on information on activities of users (group) in addition to the access log.

Here, an example of the activity is the fact that a user merely accesses content. In addition, examples of the activity include the following behaviors. For example, a user posts information on content, which he browsed, on an SNS. A user accesses a view site or a purchase site of content, which he browsed. A user selects a broadcast station of a program corresponding to content (program information), which he browsed (by using function of remote control, etc.).

That is, a user takes action against content, which he browsed. The ECG delivery server 100 detects the action as interest of the user in the content. As a result, the ECG delivery server 100 may narrow down content, of which mania level is to be calculated. In this case, the access log database 150 stores an access log and, in addition, a log about the activity.

Further, the ECG delivery server 100 calculates a mania level of a rarity level of content and a relation rarity level based on the number of pieces of content, each of which users (group) accessed in a unit time, and each of which is a target of action. In this case, a mania level may be calculated based on all the pieces of content, or based on some (predetermined number or more) pieces of content.

As a result, interest of users (group) may be reflected in a mania level of users (group), which the ECG delivery server 100 calculates.

Modification Example 5

In the above-mentioned embodiment, a mania level of a plurality of users (user group) is calculated based on an access log of the plurality of users. However, an access log (and activity log) of a user group may not be counted. Alternatively or additionally, an access log (and activity log) of one user may be counted. A mania level of each user may be calculated.

In this case, information (user ID, etc.) identifying each user is added to the access log (or activity log) of each user. The access log (or activity log) of each user and the information (user ID, etc.) identifying each user are recorded together. For example, there are three users (A, B, C). In this case, a mania level of a user group is calculated. The user group includes the user A, the user B, and the user C. In addition, an access (activity) log of the user A, an access (activity) log of the user B, and an access (activity) log of the user C may be calculated. A mania level of each user may be independently calculated based on the access (activity) log of each user. Further, the mania level of each user and a mania level of a user group may be displayed together on the user access behavior window. Further, the mania level of each user may be displayed on a content browse tendency window displayed on the client device 200 of the user A, the user B, or the user C. Here, the mania level of each user is information showing content browse tendency of each user himself.

Modification Example 6

An algorithm of searching related content depending on a mania level is not limited to the algorithm of the above-mentioned embodiment (FIG. 8). For example, the association engine 320 may not immediately change the content type, which is presented to a user having a low mania level or to a user whose mania level acceleration is being decreased. Alternatively, the association engine 320 may keep on presenting content having the similar rarity level for the time being. If the mania level is still not increased after that, then the association engine 320 may present content, of which rarity level is lower, or content of another type.

Modification Example 7

According to the above-mentioned embodiment, as shown in FIG. 1, the ECG delivery server 100 is independent of the ECG management server 300. However, one server, which includes the functions (software modules) of the ECG delivery server 100 and the functions (software modules) of the ECG management server 300, may be employed.

Modification Example 8

In the above-mentioned embodiment, the CPU controls the overall various kinds of hardware, and the CPU and the software executed by the CPU cooperatively execute the behaviors of the ECG delivery server 100. The CPU controls the overall various kinds of hardware, and the CPU and the software executed by the CPU cooperatively execute the behaviors of the ECG management server 300. However, the present technology may not necessarily be realized by controlling the overall hardware by a CPU. ICs dedicated to executing the respective behaviors may be used in combination, to thereby realize the present technology. Alternatively, the ICs and software may cooperatively realize the present technology. At least one of an MPU (Micro Processing Unit), a DSP (Digital Signal Processor), an FPGA (Field Programmable Gate Array), an ASIC (Application Specific Integrated Circuit), and the like may be used as the IC.

[Supplementary Note]

The present technology may employ the following configurations.

(1) An information processing apparatus, comprising:
storage configured to store a rarity level of each of a plurality of pieces of content, and access history of a user, the plurality of pieces of content being accessed by the user; and
a controller configured
to determine, based on the stored access history, rarity levels of a predetermined number or more of pieces of content, the pieces of content being accessed by the user in a predetermined unit time,
to calculate a preference level of the user based on the determined rarity level, and
to create information showing the calculated preference level.

(2) The information processing apparatus according to (1), wherein
the controller is configured to calculate the preference level of the user, the preference level being a ratio of the number of pieces of content each having a rarity level equal to or larger than a predetermined threshold to the number of the predetermined number or more of pieces of content, the pieces of content being accessed by the user in the predetermined unit time.

(3) The information processing apparatus according to (1) or (2), wherein
the controller is configured
to calculate acceleration of the preference level, the acceleration of the preference level being a differential between a first preference level and a second preference level, the first preference level being calculated in a first unit time, the second preference level being calculated in a second unit time, the second unit time being later than the first unit time, and
to create information showing the calculated acceleration of the preference level.

(4) The information processing apparatus according to any one of (1) to (3), wherein
the storage is configured to store a relation rarity level, the relation rarity level being of relation between a plurality of pieces of content, and
the controller is configured
to determine the relation rarity level between first content and second content, the first content being accessed by the user, the second content being accessed by the user after the first content, and
to calculate the preference level based on the determined rarity level and the determined relation rarity level.

(5) The information processing apparatus according to any one of (1) to (4), wherein
the controller is configured to create information showing content to be recommended to the user based on the calculated preference level, the content to be recommended relating to content accessed by the user.

(6) The information processing apparatus according to any one of (1) to (5), wherein
the controller is configured to add predetermined alert information to information showing the preference level in a case where the calculated preference level is equal to or lower than a predetermined threshold.

(7) The information processing apparatus according to any one of (1) to (6), wherein
the controller is configured to create a user interface, the user interface including information showing first content and icons showing a plurality of pieces of second content, the information showing first content being arranged in a first area, the icons showing a plurality of pieces of second content being arranged in a second area, the second content being different from the first content, the second area being different from the first area, the icon being displayed in a display mode depending on the rarity level of each second content or in a display mode depending on the relation rarity level between each second content and the first content.

(8) The information processing apparatus according to (7), wherein
the controller is configured to change the size of the icon on the user interface depending on change of the preference level of a user.

(9) The information processing apparatus according to any one of (1) to (8), wherein
the controller is configured to set higher rarity level to the content in a case where awareness of information on a creator of the content is lower.

(10) The information processing apparatus according to any one of (4) to (9), wherein
the controller is configured to set a higher relation rarity level between the first content and the second content in a case where the number of pieces of metadata common to a plurality of pieces of metadata on the first content and a plurality of pieces of metadata on the second content is smaller.

(11) The information processing apparatus according to any one of (4) to (9), wherein
the controller is configured to set a higher relation rarity level between the first content and the second content in a case where the number of access to the second content by the user immediately after accessing the first content is smaller.

(12) The information processing apparatus according to any one of (4) to (9), wherein
the controller is configured to set a higher relation rarity level between the first content and the second content in a case where the number of pieces of other content between the first content accessed by the user and the second content accessed by the user is larger.

The present disclosure contains subject matter related to that disclosed in Japanese Priority Patent Application JP 2012-180381 filed in the Japan Patent Office on Aug. 16, 2012, the entire content of which is hereby incorporated by reference.

What is claimed is:

1. An information processing apparatus, comprising:
storage configured to store a rarity level of each of a plurality of pieces of content, and access history of a user, the plurality of pieces of content being accessed by the user; and
a controller configured
to determine, based on the stored access history, rarity levels of a predetermined number or more of pieces of content, the pieces of content being accessed by the user in a predetermined unit time,
to calculate a preference level of the user based on the determined rarity level, and
to create information showing the calculated preference level.

2. The information processing apparatus according to claim 1, wherein
the controller is configured to calculate the preference level of the user, the preference level being a ratio of the number of pieces of content each having a rarity level equal to or larger than a predetermined threshold to the number of the predetermined number or more of pieces of content, the pieces of content being accessed by the user in the predetermined unit time.

3. The information processing apparatus according to claim 1, wherein
the controller is configured
to calculate acceleration of the preference level, the acceleration of the preference level being a differential between a first preference level and a second preference level, the first preference level being calculated in a first unit time, the second preference level being calculated in a second unit time, the second unit time being later than the first unit time, and
to create information showing the calculated acceleration of the preference level.

4. The information processing apparatus according to claim 1, wherein
the storage is configured to store a relation rarity level, the relation rarity level being of relation between a plurality of pieces of content, and
the controller is configured
to determine the relation rarity level between first content and second content, the first content being accessed by the user, the second content being accessed by the user after the first content, and
to calculate the preference level based on the determined rarity level and the determined relation rarity level.

5. The information processing apparatus according to claim 1, wherein
the controller is configured to create information showing content to be recommended to the user based on the calculated preference level, the content to be recommended relating to content accessed by the user.

6. The information processing apparatus according to claim 1, wherein
the controller is configured to add predetermined alert information to information showing the preference level in a case where the calculated preference level is equal to or lower than a predetermined threshold.

7. The information processing apparatus according to claim 1, wherein
the controller is configured to create a user interface, the user interface including information showing first content and icons showing a plurality of pieces of second content, the information showing first content being arranged in a first area, the icons showing a plurality of pieces of second content being arranged in a second area, the second content being different from the first content, the second area being different from the first area, the icon being displayed in a display mode depending on the rarity level of each second content or in a display mode depending on the relation rarity level between each second content and the first content.

8. The information processing apparatus according to claim 7, wherein
the controller is configured to change the size of the icon on the user interface depending on change of the preference level of a user.

9. The information processing apparatus according to claim 1, wherein
the controller is configured to set higher rarity level to the content in a case where awareness of information on a creator of the content is lower.

10. The information processing apparatus according to claim 4, wherein
the controller is configured to set a higher relation rarity level between the first content and the second content in a case where the number of pieces of metadata common to a plurality of pieces of metadata on the first content and a plurality of pieces of metadata on the second content is smaller.

11. The information processing apparatus according to claim 4, wherein
the controller is configured to set a higher relation rarity level between the first content and the second content in a case where the number of access to the second content by the user immediately after accessing the first content is smaller.

12. The information processing apparatus according to claim 4, wherein
the controller is configured to set a higher relation rarity level between the first content and the second content in a case where the number of pieces of other content between the first content accessed by the user and the second content accessed by the user is larger.

13. An information processing method for use in an information processing apparatus having a storage device and a controller, said method comprising:
storing, in the storage device, a rarity level of each of a plurality of pieces of content, and access history of a user, the plurality of pieces of content being accessed by the user;
determining, based on the stored access history, rarity levels of a predetermined number or more of pieces of content, the pieces of content being accessed by the user in a predetermined unit time;
calculating a preference level of the user based on the determined rarity level; and
creating information showing the calculated preference level,
in which the determining, the calculating and the creating are performed by the calculating device.

14. A non-transitory computer readable recording medium having stored thereon a program to cause an information processing apparatus to execute the steps of:
storing a rarity level of each of a plurality of pieces of content, and access history of a user, the plurality of pieces of content being accessed by the user;
determining, based on the stored access history, rarity levels of a predetermined number or more of pieces of content, the pieces of content being accessed by the user in a predetermined unit time;
calculating a preference level of the user based on the determined rarity level; and
creating information showing the calculated preference level.

* * * * *